(12) United States Patent
Lin et al.

(10) Patent No.: US 7,099,515 B2
(45) Date of Patent: Aug. 29, 2006

(54) BITPLANE CODING AND DECODING FOR AC PREDICTION STATUS INFORMATION

(75) Inventors: Chih-Lung Lin, Redmond, WA (US); Pohsiang Hsu, Redmond, WA (US); Sridhar Srinivasan, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/933,883

(22) Filed: Sep. 2, 2004

(65) Prior Publication Data

US 2005/0053156 A1   Mar. 10, 2005

Related U.S. Application Data

(60) Provisional application No. 60/501,081, filed on Sep. 7, 2003.

(51) Int. Cl.
G06K 9/36 (2006.01)
G06K 9/46 (2006.01)

(52) U.S. Cl. ............... 382/240; 382/232; 382/233; 382/238; 382/236; 375/240.12; 375/240.13; 375/240.24

(58) Field of Classification Search ............... 382/236, 382/238, 232, 233, 244, 245, 248, 250–253; 375/240.12, 240.13, 240.15, 240.22, 240.24, 375/240.2; 348/413.1, 411.1, 415.1, 416.1, 348/420.1, 412.1; 341/51
See application file for complete search history.

(56) References Cited

U.S. PATENT DOCUMENTS 4,454,546 A    6/1984   Mori
4,691,329 A    9/1987   Juri et al.
4,796,087 A    1/1989   Guichard et al.
4,800,432 A    1/1989   Barnett et al.
4,849,812 A    7/1989   Borgers et al.
5,021,879 A    6/1991   Vogel
5,068,724 A   11/1991   Krause et al.
5,091,782 A    2/1992   Krause et al.
5,157,490 A   10/1992   Kawai et al.
5,258,836 A   11/1993   Murata
5,422,676 A    6/1995   Herpel et al.
5,448,297 A    9/1995   Alattar et al.

(Continued)

FOREIGN PATENT DOCUMENTS

EP           0 279 053            8/1988

(Continued)

OTHER PUBLICATIONS

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

(Continued)

*Primary Examiner*—Jingge Wu
*Assistant Examiner*—Ali Bayat
(74) *Attorney, Agent, or Firm*—Klarquist Sparkman, LLP

(57) ABSTRACT

In one aspect, an encoder/decoder selects a bitplane mode from a group of plural available bitplane modes, and processes a bitplane according to the selected bitplane mode, wherein the bitplane indicates AC prediction status information for plural macroblocks of a video picture. In another aspect, an encoder encodes a bitplane that indicates AC prediction status information for plural macroblocks of a video picture and signals the encoded bitplane. In another aspect, a decoder receives an encoded bitplane and decodes the bitplane, wherein the bitplane indicates AC prediction status information for plural macroblocks of a video picture.

20 Claims, 22 Drawing Sheets

U.S. PATENT DOCUMENTS

| | | | |
|---|---|---|---|
| 5,461,421 | A | 10/1995 | Moon |
| 5,467,086 | A | 11/1995 | Jeong |
| RE35,158 | E | 2/1996 | Sugiyama |
| 5,510,840 | A | 4/1996 | Yonemitsu et al. |
| 5,539,466 | A | 7/1996 | Igarashi et al. |
| 5,544,286 | A | 8/1996 | Laney |
| 5,552,832 | A | 9/1996 | Astle |
| 5,666,461 | A | 9/1997 | Igarashi et al. |
| 5,668,932 | A | 9/1997 | Laney |
| 5,673,370 | A | 9/1997 | Laney |
| 5,748,789 | A | 5/1998 | Lee et al. |
| 5,764,814 | A | 6/1998 | Chen et al. |
| 5,784,175 | A | 7/1998 | Lee |
| 5,874,995 | A * | 2/1999 | Naimpally et al. ..... 375/240.25 |
| 5,946,042 | A | 8/1999 | Kato |
| 5,946,043 | A | 8/1999 | Lee et al. |
| 5,946,419 | A | 8/1999 | Chen et al. |
| 5,970,173 | A | 10/1999 | Lee et al. |
| 5,982,437 | A | 11/1999 | Okazaki et al. |
| 6,040,863 | A | 3/2000 | Kato |
| RE36,822 | E | 8/2000 | Sugiyama |
| 6,154,495 | A | 11/2000 | Yamaguchi et al. |
| 6,208,761 | B1 | 3/2001 | Passagio et al. |
| RE37,222 | E | 6/2001 | Yonemitsu et al. |
| 6,259,810 | B1 | 7/2001 | Gill et al. |
| 6,271,885 | B1 | 8/2001 | Sugiyama |
| 6,275,531 | B1 | 8/2001 | Li |
| 6,292,585 | B1 | 9/2001 | Yamaguchi et al. |
| 6,304,928 | B1 | 10/2001 | Mairs et al. |
| 6,324,216 | B1 | 11/2001 | Igarashi et al. |
| 6,563,953 | B1 | 5/2003 | Lin et al. |
| 6,573,905 | B1 * | 6/2003 | MacInnis et al. ........... 345/629 |
| 2002/0012394 | A1 * | 1/2002 | Hatano et al. ......... 375/240.02 |
| 2002/0168066 | A1 | 11/2002 | Li |
| 2003/0113026 | A1 | 6/2003 | Srinivasan et al. |
| 2003/0142748 | A1 | 7/2003 | Tourapis |
| 2004/0042549 | A1 * | 3/2004 | Huang et al. .......... 375/240.11 |
| 2004/0136457 | A1 * | 7/2004 | Funnell et al. ......... 375/240.01 |
| 2004/0141651 | A1 * | 7/2004 | Hara et al. .................. 382/232 |
| 2005/0254584 | A1 * | 11/2005 | Kim et al. ............. 375/240.27 |

FOREIGN PATENT DOCUMENTS

| | | |
|---|---|---|
| EP | 0 830 029 | 3/1998 |
| JP | 61205086 | 9/1986 |
| JP | 3001688 | 1/1991 |
| JP | 6078298 | 3/1994 |
| JP | 7274171 | 10/1995 |
| JP | 6292188 | 10/2004 |
| KR | 1003538510000 | 1/2002 |

OTHER PUBLICATIONS

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audio-visual Services at $p \times 64$ kbits," 28 pp. (1993).

ITU-T, "ITU-T Recommendation H.262: Information Technology—Generic Coding of Moving Pictures and Associated Audio Information: Video1," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

U.S. Appl. No. 60/341,674, filed Dec. 17, 2001, Lee et al.

U.S. Appl. No. 60/488,710, filed Jul. 18, 2003, Srinivasan et al.

"ITU-T Recommendation T.6: Facsimile Coding Schemes and Coding Control Functions for Group 4 Facsimile Apparatus,"*Facicle VII.3 of the Blue Book*, (1988).

"Coding of Moving Pictures and Associated Audio Information," *ISO/IEC JTCI/SC29/WG11, MPEG-4 Video Verification Model* (Feb. 1998).

Hsu et al., "A Low Bit-Rate Video Codec Based on Two-Dimensional Mesh Motion Compensation with Adaptive Interpolation," *IEEE, Transactions on Circuits and Systems for Video Technology*, vol. II, No. 1, pp. 111-117 (Jan. 2001).

Sjoberg et al., "Run-length Coding of Skipped Macroblocks," ITU-T SG16/Q.6 VCEG-M57, pp. 1-5 (Apr. 2001).

"Interlace Coding Tools for H.26L Video Coding," *Fifteenth Meeting of ITU Telecommunications Standardization Sector, Study Group 16, VCEG, Thailand* (Dec. 2001).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005).

* cited by examiner

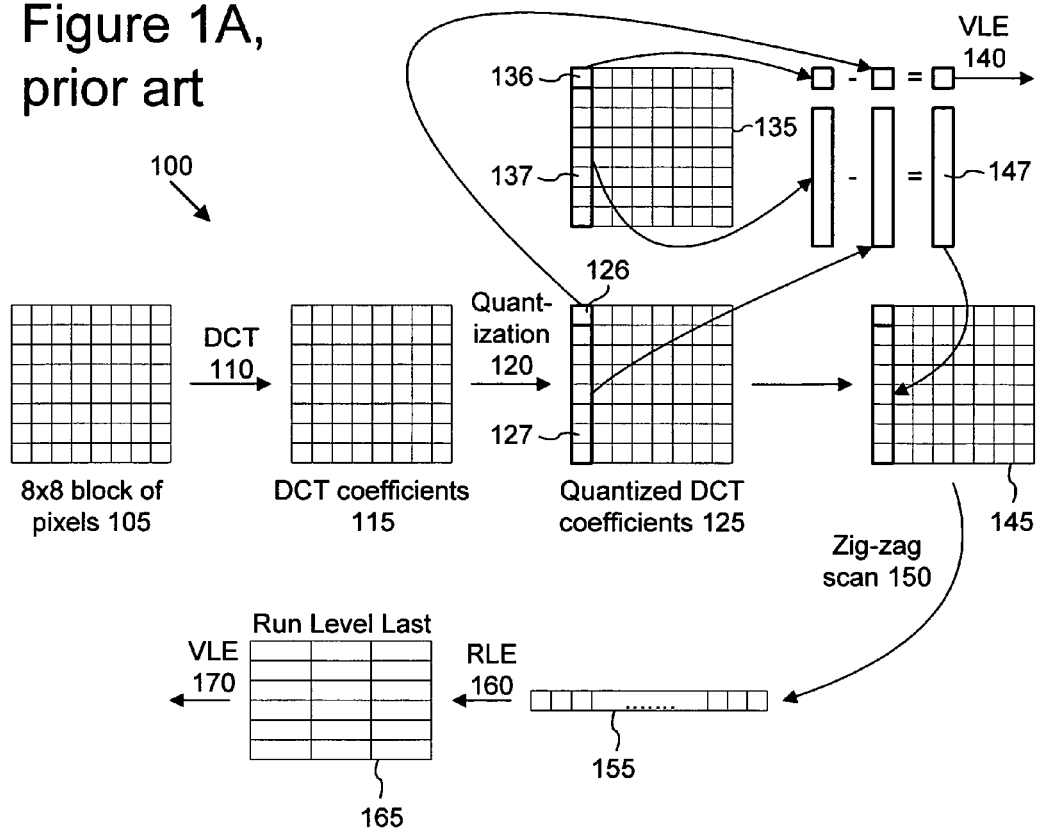

Figure 1B, prior art
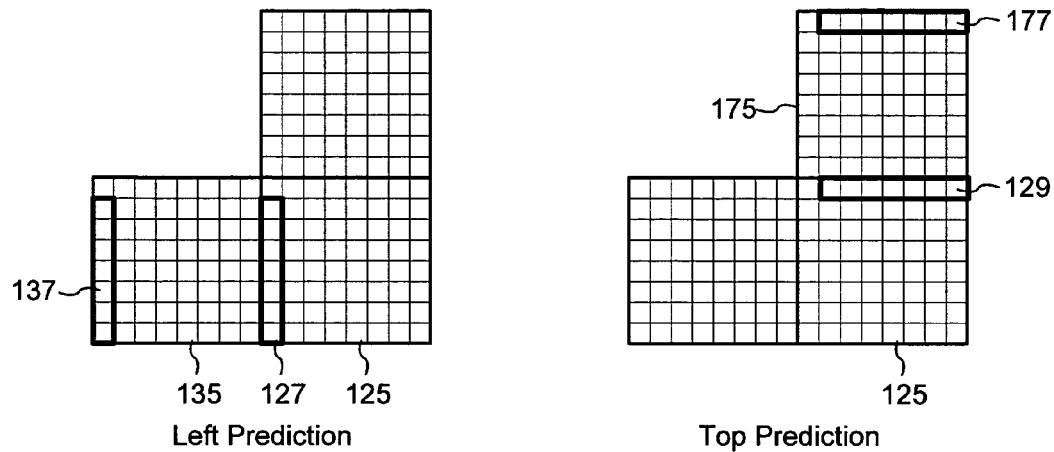
Left Prediction — 135 127 125, 137
Top Prediction — 125, 175, 177, 129
Figure 2, prior art
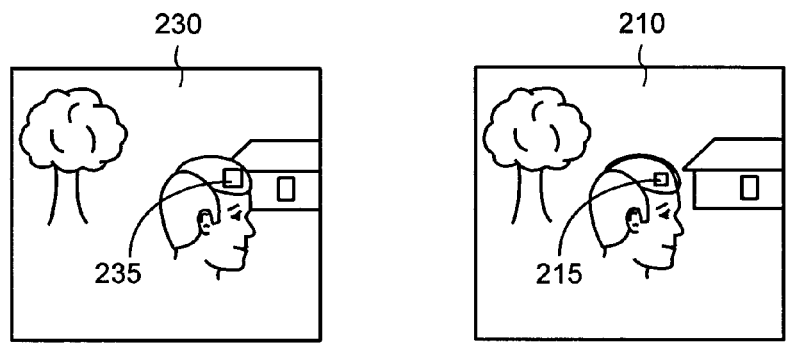
Figure 5, prior art
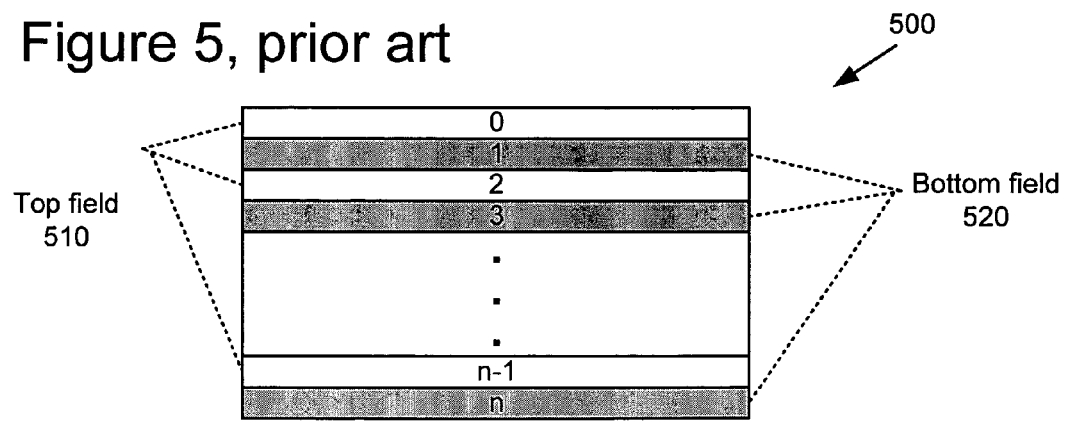

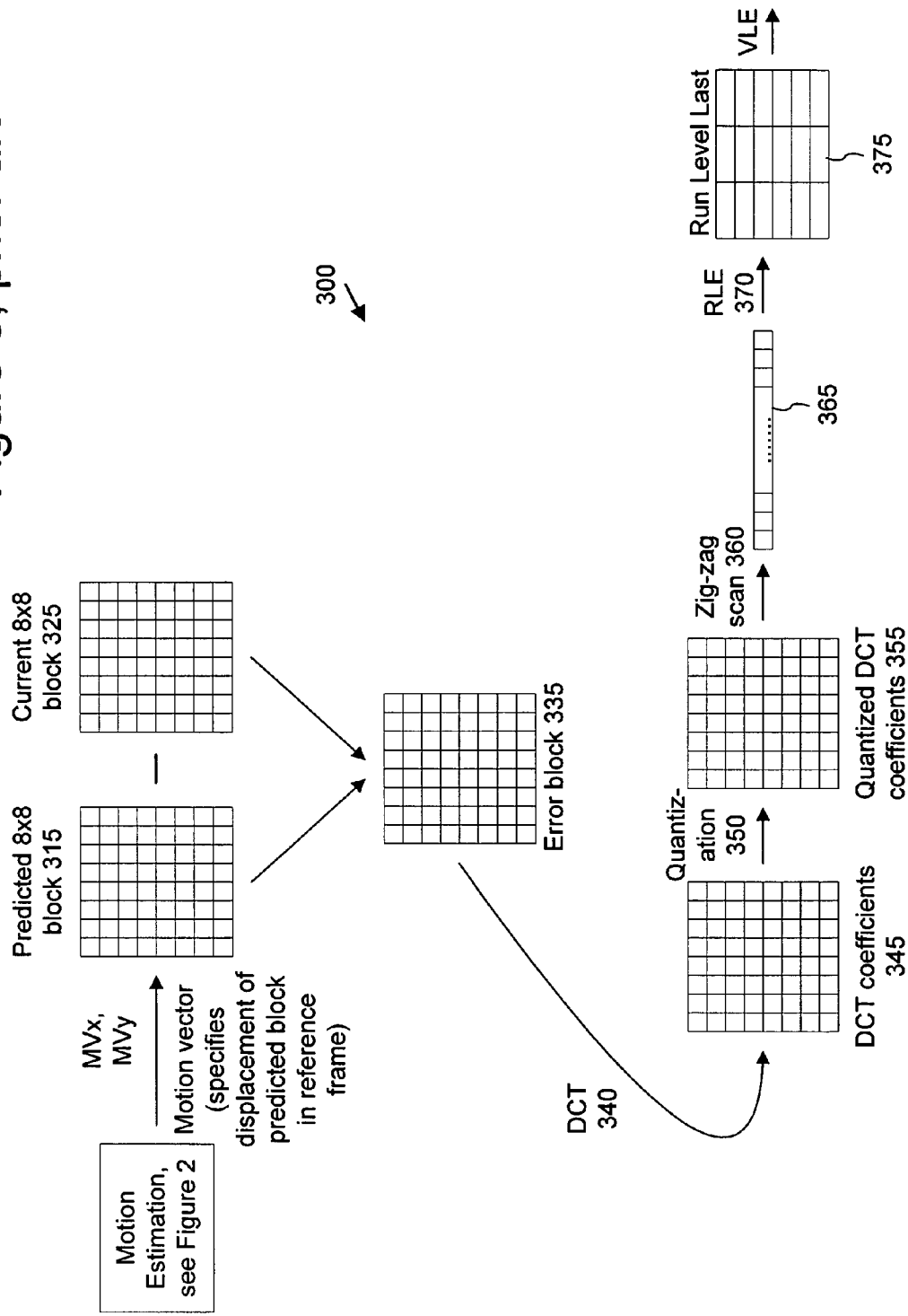

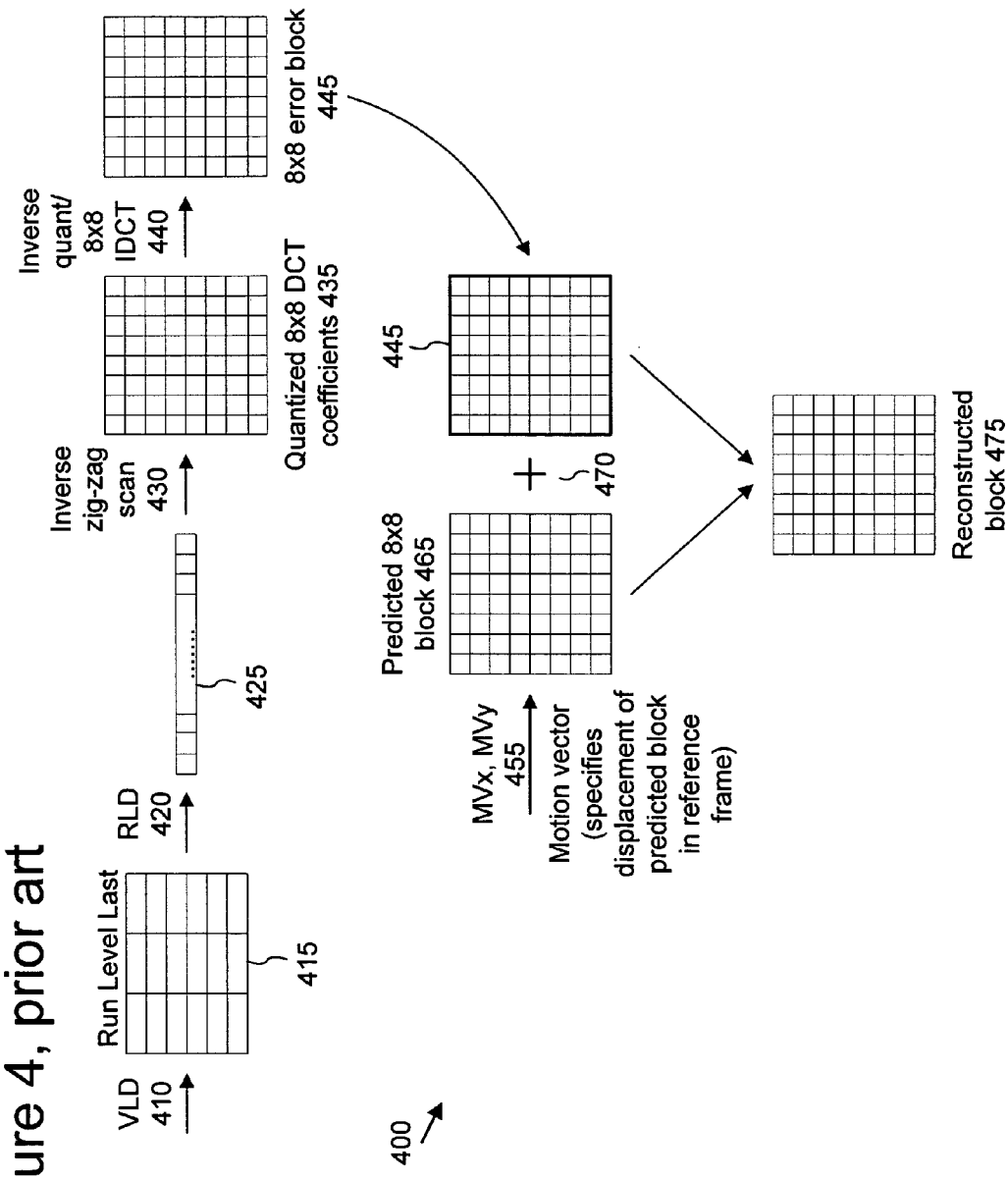
Figure 4, prior art

Figure 6, prior art
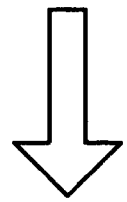

Macroblock Layer Progressive I-frame Bitstream Syntax 1500

Frame Layer
Interlace P-frame
Bitstream Syntax
1900

Macroblock Layer Interlaced I-frame Bitstream Syntax 2100

BITPLANE CODING AND DECODING FOR AC PREDICTION STATUS INFORMATION

RELATED APPLICATION INFORMATION

This application claims the benefit of U.S. Provisional Patent Application No. 60/501,081, entitled "Video Encoding and Decoding Tools and Techniques," filed Sep. 7, 2003, which is hereby incorporated by reference.

The following co-pending U.S. patent application relates to the present application and is hereby incorporated by reference: U.S. patent application Ser. No. 10/933,959, entitled, "Bitplane Coding for Macroblock Field/Frame Codin Type Information," filed concurrently herewith.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for video coding and decoding are described. For example, an encoder bitplane codes AC prediction status information for macroblocks in a picture. A decoder performs corresponding decoding.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. For video frames, intra compression techniques compress individual frames, typically called I-frames or key frames. Inter compression techniques compress frames with reference to preceding and/or following frames, and inter-compressed frames are typically called predicted frames, P-frames, or B-frames.

I. Inter and Intra Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

A. Intra Compression

FIG. 1A illustrates block-based intra compression 100 of a block 105 of pixels in a key frame in the WMV8 encoder. A block is a set of pixels, for example, an 8×8 arrangement of pixels. The WMV8 encoder splits a key video frame into 8×8 blocks of pixels and applies an 8×8 Discrete Cosine Transform ["DCT"] 110 to individual blocks such as the block 105. A DCT is a type of frequency transform that converts the 8×8 block of pixels (spatial information) into an 8×8 block of DCT coefficients 115, which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. For example, the encoder applies a uniform, scalar quantization step size to each coefficient. Quantization is lossy. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1A shows a neighbor block 135 that is situated to the left of the block being encoded in the frame.) The encoder entropy encodes 140 the differential.

The entropy encoder can encode the left column or top row of AC coefficients as a differential from a corresponding left column or top row of the neighboring 8×8 block. This is an example of AC coefficient prediction. FIG. 1A shows the left column 127 of AC coefficients encoded as a differential 147 from the left column 137 of the neighboring (in reality, to the left) block 135. The differential coding increases the chance that the differential coefficients have zero values. The remaining AC coefficients are from the block 125 of quantized DCT coefficients.

FIG. 1B shows AC prediction candidates for an 8×8 block in an I-frame. For top prediction, the top row 177 of AC coefficients in the top neighboring block 175 is used as the predictor for the top row 129 of AC coefficients in the block 125 of quantized DCT coefficients. For left prediction, the leftmost column 137 of AC coefficients in the left neighboring block 135 is used as the predictor for the leftmost column of AC coefficients in the block 125.

In some modes, the AC coefficient predictors are scaled or otherwise processed before computation of or combination with differential values.

If a neighboring block does not exist in the specified prediction direction, the predicted values for all seven AC coefficients in the leftmost column or top row are set to zero. For example, if the prediction direction is up and the current block is in the top row, each of the predicted AC coefficients in the top row of the current block are set to zero because there is no adjacent block in the up direction. The AC coefficients in the predicted row or column are added to the corresponding decoded AC coefficients (which are differential values) in the current block to produce the fully reconstructed quantized transform coefficient block.

The encoder scans 150 the 8×8 block 145 of quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Inter Compression

Inter compression in the WMV8 encoder uses block-based motion compensated prediction coding followed by transform coding of the residual error. FIGS. 2 and 3 illustrate the block-based inter compression for a predicted frame in the WMV8 encoder. In particular, FIG. 2 illustrates motion estimation for a predicted frame 210 and FIG. 3 illustrates compression of a prediction residual for a motion-compensated block of a predicted frame.

For example, in FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. The encoder outputs information specifying the motion vector (entropy coded) for the matching macroblock. The motion vector is differentially coded with respect to a motion vector predictor.

After reconstructing the motion vector by adding the differential to the motion vector predictor, a decoder uses the motion vector to compute a prediction macroblock for the macroblock 215 using information from the reference frame 230, which is a previously reconstructed frame available at the encoder and the decoder. The prediction is rarely perfect, so the encoder usually encodes blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The encoder scans 360 the 8×8 block 355 into a one-dimensional array 365 such that coefficients are generally ordered from lowest frequency to highest frequency. The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse DCTs (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

In software for a previous WMV encoder and software for a previous WMV decoder, AC prediction information is signaled on a one bit per macroblock basis at macroblock level in the bitstream.

The ACPRED field is a one-bit, macroblock-level bitstream element that specifies whether AC prediction is used to decode the AC coefficients for all the blocks in a macroblock. ACPRED is present in I-frames and in 1 MV intra macroblocks in predicted frames. ACPRED=0 generally indicates that AC prediction is not used in the macroblock, and ACPRED=1 generally indicates that AC prediction is used in the macroblock. The predictor block is either the block immediately above or to the left of the current block. However, in a predicted frame (e.g., a P-frame or B-frame), if the top predictor block and left predictor block are not Intra-coded, AC prediction is not used even if ACPRED=1.

The encoder and decoder also use signaling of AC prediction for interlaced frames. The ACPREDMB flag is a one-bit value present at macroblock level for frame-coded macroblocks that specifies whether AC prediction is used for all the blocks in the macroblock. The ACPREDTFIELD and ACPREDBFIELD flags are one-bit values present at macroblock level for field-coded macroblocks that specify whether AC prediction is used for blocks in the top and the bottom field of a current macroblock, respectively.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 5, an interlaced video frame 500 includes top field 510 and bottom field 520. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

Software for a previous WMV encoder and software for a previous decoder use macroblocks that are arranged according to a field structure (field-coded macroblocks) or a frame structure (frame-coded macroblocks) in interlaced video frames. FIG. 6 shows a structure for field-coded macroblocks in the encoder and decoder. An interlaced macroblock 610 is permuted such that all the top field lines (e.g., even-numbered lines 0, 2, . . . 14) are placed in the top half of the field-coded macroblock 620, and all the bottom field lines (e.g., odd-numbered lines 1, 3, . . . 15) are placed in the bottom half of the field-coded macroblock. For a frame-coded macroblock, the top field lines and bottom field lines alternate throughout the macroblock, as in interlaced macroblock 610.

The previous encoder and decoder use a 4:1:1 macroblock format in interlaced frames. A 4:1:1 macroblock is composed of four 8×8 luminance blocks and two 4×8 blocks of each chrominance channel. In a field-coded 4:1:1 macroblock, the permuted macroblock is subdivided such that the top two 8×8 luminance blocks and the top 4×8 chrominance block in each chrominance channel contain only top field lines, while the bottom two 8×8 luminance blocks and the bottom 4×8 chrominance block in each chrominance channel contain only bottom field lines.

A typical progressive video frame consists of one frame of content with non-alternating lines. In contrast to interlaced video, progressive video does not divide video frames into separate fields, and an entire frame is scanned left to right, top to bottom starting at a single time.

III. Signaling Frame/Field Mode for Interlaced Macroblocks

In software for a previous WMV encoder and decoder, the INTRLCF field is a one-bit, frame layer element used to signal whether macroblocks are coded in frame mode only, or in field or frame mode. If INTRLCF=0, all macroblocks in the frame are coded in frame mode. If INTRLCF=1, the macroblocks in the frame may be coded in field or frame mode, and the INTRLCMB field follows in the bitstream to indicate the frame/field coding status for each macroblock. INTRLCMB is a bitplane present in progressive I-frames, interlaced I-frames, interlaced P-frames and interlaced B-frames. The decoded INTRLCMB bitplane represents the interlaced status for each macroblock as a field of one-bit values in raster scan order from upper left to lower right. A value of 0 indicates that the corresponding macroblock is coded in frame mode. A value of 1 indicates that the corresponding macroblock is coded in field mode.

The field/frame coding mode is signaled for each macroblock in progressive I-frames, interlaced I-frames, interlaced P-frames and interlaced B-frames, and the field/frame coding mode is signaled only at frame level by a bitplane. No macroblock layer signaling option is available to signal field/frame coding mode, which limits the flexibility of the signaling.

IV. Bitplane Coding in Software for a Previous WMV Encoder and Decoder

In software for a previous WMV encoder and decoder, certain binary information for macroblocks in a frame is coded as a two-dimensional array in one of seven bitplane coding modes, and transmitted in a frame header.

The encoder and decoder use bitplane coding to signal four different kinds of binary information at frame level for macroblocks in a frame: (1) skipped/not skipped macroblocks, (2) field or frame coding mode in interlaced pictures, (3) one motion vector ["1MV"] or four motion vector ["4MV"] coding mode; and (4) direct/not direct prediction mode in B-frames. The following syntax elements are used in the bitplane coding scheme.

INVERT

The INVERT field is a one bit code that indicates whether that the bitplane has more bits equal to 0 or more bits equal to 1. Depending on INVERT and the bitplane coding mode, the decoder may invert the decoded bitplane to recreate the original.

IMODE

The IMODE field is a variable-length code ["VLC"] representing the bitplane coding mode. In general, shorter codes are used to encode more frequently occurring coding modes.

DATABITS

The DATABITS field is an entropy-coded stream of symbols based on the coding mode signaled in the IMODE field. The size of each two-dimensional array is rowMB× colMB, where rowMB and colMB are the number of macroblock rows and columns, respectively, in the frame. Within the bitstream, each array is coded as a set of consecutive bits in one of seven bitplane coding modes. The seven bitplane coding modes are described below.

1. Raw Mode

In Raw mode, the bitplane is encoded as one bit per pixel scanned in the natural scan order. DATABITS is rowMB× colMB bits in length.

2. Row-Skip Mode

In Row-skip mode, the ROWSKIP field indicates whether the ROWBITS field is present for each row in the bitplane. If an entire row of values in the bitplane is zero, ROWSKIP=0 and ROWBITS is skipped. If at least one value in the row is non-zero, ROWSKIP=1 and ROWBITS contains one bit for each value in the row. Rows are scanned from the top to the bottom of the frame.

3. Column-Skip Mode

In Column-skip mode, the COLUMNSKIP field indicates whether the COLUMNBITS field is present for each column in the bitplane. If an entire column of values in the bitplane is zero, COLUMNSKIP=0 and COLUMNBITS is skipped. If at least one value in the column is non-zero, COLUMN-SKIP=1 and COLUMNBITS contains one bit for each value in the column. Columns are scanned from the left to the right of the frame.

4. Normal-2 Mode

In Normal-2 mode, if rowMB×colMB is odd, the first symbol is simply represented with one bit matching its value, and subsequent symbols are encoded in pairs in natural scan order using a binary VLC table.

5. Normal-6 Mode

In Normal-6 mode, the bitplane is encoded in groups of six pixels. These pixels are grouped into either 2×3 or 3×2 tiles. The bitplane is tiled maximally using a set of tiling rules, and the remaining pixels are encoded using a variant of the Row-skip and Column-skip modes. 3×2 "vertical" tiles are used if and only if rowMB is a multiple of 3 and colMB is not. Otherwise, 2×3 "horizontal" tiles are used.

The six-element tiles are encoded first, followed by the Column-skip and Row-skip encoded linear tiles. If the array size is a multiple of 3×2 or of 2×3, the latter linear tiles do not exist and the bitplane is tiled with only six-element rectangular tiles.

6, 7. Diff-2 and Diff-6 Modes

If either differential mode (Diff-2 or Diff-6) is used, a bitplane of "differential bits" is decoded using the corresponding normal modes (Normal-2 or Normal-6, respectively). The differential bits are used to regenerate the original bitplane.

For more information on bitplane coding, see U.S. patent application Ser. No. 10/321,415, entitled "Skip Macroblock Coding," filed Dec. 16, 2002.

V. Standards for Video Compression and Decompression

Several international standards relate to video compression and decompression. These standards include the Motion Picture Experts Group ["MPEG"] 1, 2, and 4 standards and the H.261, H.262 (another title for MPEG-2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Signaling Field- or Frame-coded Macroblocks in the Standards

Some international standards describe signaling of field coding or frame coding for macroblocks in interlaced pictures.

Draft JVT-d157 of the JVT/AVC standard describes the mb_field_decoding_flag syntax element, which is used to signal whether a macroblock pair is decoded in frame mode or field mode in interlaced P-frames. Section 7.3.4 describes a bitstream syntax where mb_field_decoding_flag is sent as an element of slice data in cases where a sequence parameter (mb_frame_field_adaptive_flag) indicates switching between frame and field decoding in macroblocks and a slice header element (pic_structure) identifies the picture structure as an interlaced frame picture.

The May 28, 1998 committee draft of MPEG-4 describes the dct_type syntax element, which is used to signal whether a macroblock is frame DCT coded or field DCT coded. According to Sections 6.2.7.3 and 6.3.7.3, dct_type is a macroblock-layer element that is only present in the MPEG-4 bitstream in interlaced content where the macroblock has a non-zero coded block pattern or is intra-coded.

In MPEG-2, the dct_type element is also a macroblock-layer element that indicates whether a macroblock is frame DCT coded or field DCT coded. MPEG-2 also describes a picture coding extension element frame_pred_frame_dct. When frame_pred_frame_dct is set to '1', only frame DCT coding is used in interlaced frames. The condition dct_type=0 is "derived" when frame_pred_frame_dct=1 and the dct_type element is not present in the bitstream.

B. Signaling AC Coefficient Prediction in the Standards

Some international standards describe signaling of different spatial AC coefficient prediction modes for macroblocks.

The May 28, 1998 committee draft of MPEG-4 describes the ac_pred_flag syntax element, which is a one-bit flag for signaling whether AC coefficients in the first row or column of an intra macroblock are differentially coded. In the MPEG-4 bitstream, ac_pred_flag is sent on a one bit per macroblock basis in a data partitioning data structure of a video object plane (e.g., data_partitioned_I_VOP( ), data_partitioned_P_VOP( )) or in a macroblock layer data structure (macroblock( )).

In the H.263 standard, Annex I describes an advanced intra coding mode that optionally uses AC prediction. The macroblock layer element INTRA_MODE is a variable length code that signals whether a macroblock is encoded in a mode that uses AC prediction.

C. Limitations of the Standards

These international standards are limited in several important ways. For example, although the standards provide for signaling of field/frame type information and AC prediction, the signaling is typically performed on a one bit per macroblock basis.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for video coding and decoding. For example, an encoder bitplane codes AC prediction status information for macroblocks in a picture. A decoder performs corresponding decoding. Described embodiments implement one or more of the described techniques and tools including, but not limited to, the following:

In one aspect, an encoder/decoder selects a bitplane mode from a group of plural available bitplane modes, and processes a bitplane according to the selected bitplane mode, wherein the bitplane indicates AC prediction status information for plural macroblocks of a video picture.

In another aspect, an encoder encodes a bitplane that indicates AC prediction status information for plural macroblocks of a video picture and signals the encoded bitplane.

In another aspect, a decoder receives an encoded bitplane and decodes the bitplane, wherein the bitplane indicates AC prediction status information for plural macroblocks of a video picture.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1A is a diagram showing block-based intraframe compression of an 8×8 block of pixels according to the prior art. FIG. 1B shows AC prediction candidates for an 8×8 block of pixels according to the prior art.

FIG. 2 is a diagram showing motion estimation in a video encoder according to the prior art.

FIG. 3 is a diagram showing block-based compression for an 8×8 block of prediction residuals in a video encoder according to the prior art.

FIG. 4 is a diagram showing block-based decompression for an 8×8 block of prediction residuals in a video encoder according to the prior art.

FIG. 5 is a diagram showing an interlaced frame according to the prior art.

FIG. 6 is a diagram showing field coding of interlaced macroblocks according to the prior art.

DETAILED DESCRIPTION

The present application relates to techniques and tools for efficient compression and decompression of progressive and interlaced video. In various described embodiments, a video encoder and decoder incorporate techniques for encoding and decoding progressive and interlaced video, and corresponding signaling techniques for use with a bitstream format or syntax comprising different layers or levels (e.g., sequence level, frame level, field level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to forward prediction may also be applicable to other types of prediction.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 7:
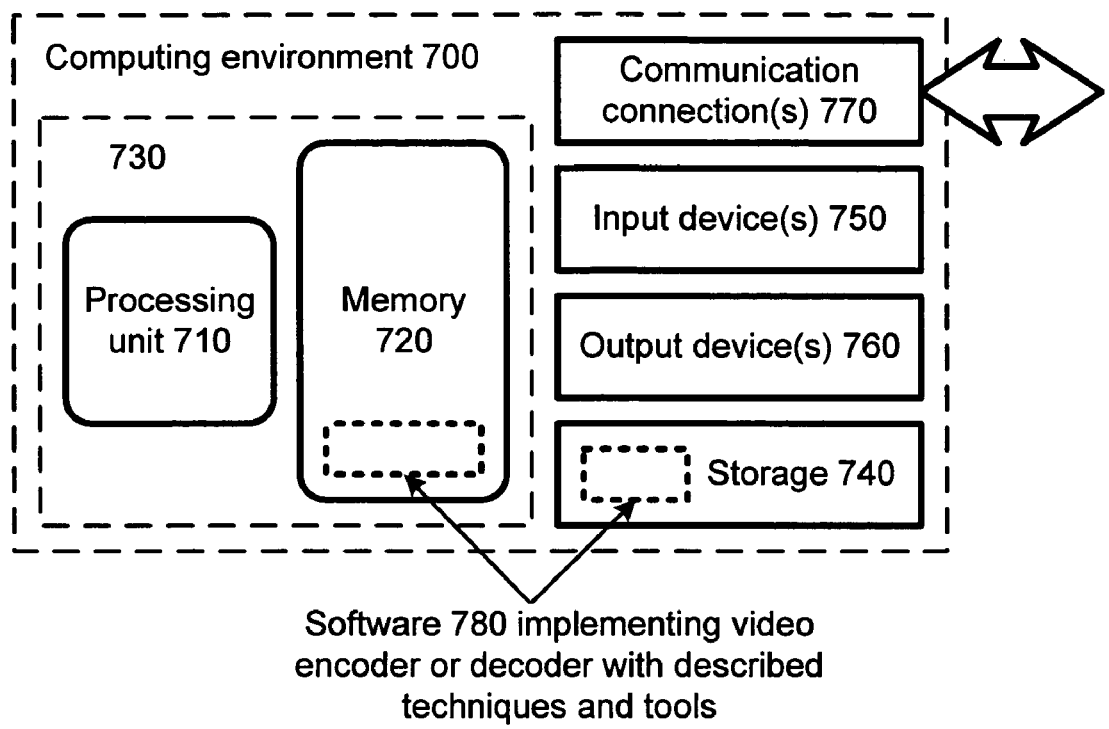
FIG. 7 is a block diagram of a suitable computing environment in conjunction with which several described embodiments may be implemented.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing a video encoder or decoder with one or more of the described techniques and tools.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder or decoder.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
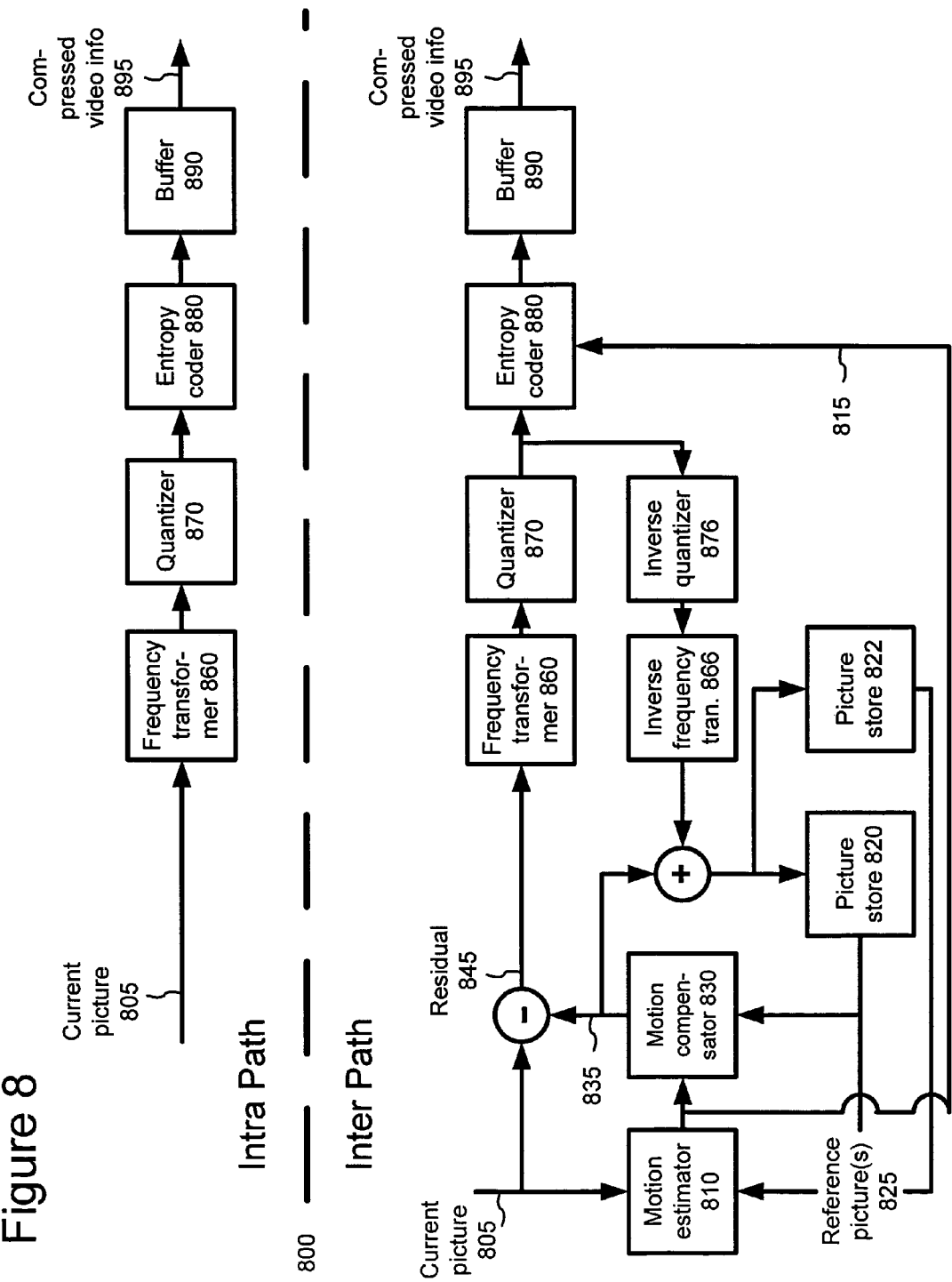
FIG. 8 is a block diagram of a generalized video encoder system in conjunction with which several described embodiments may be implemented.
Figure 9:
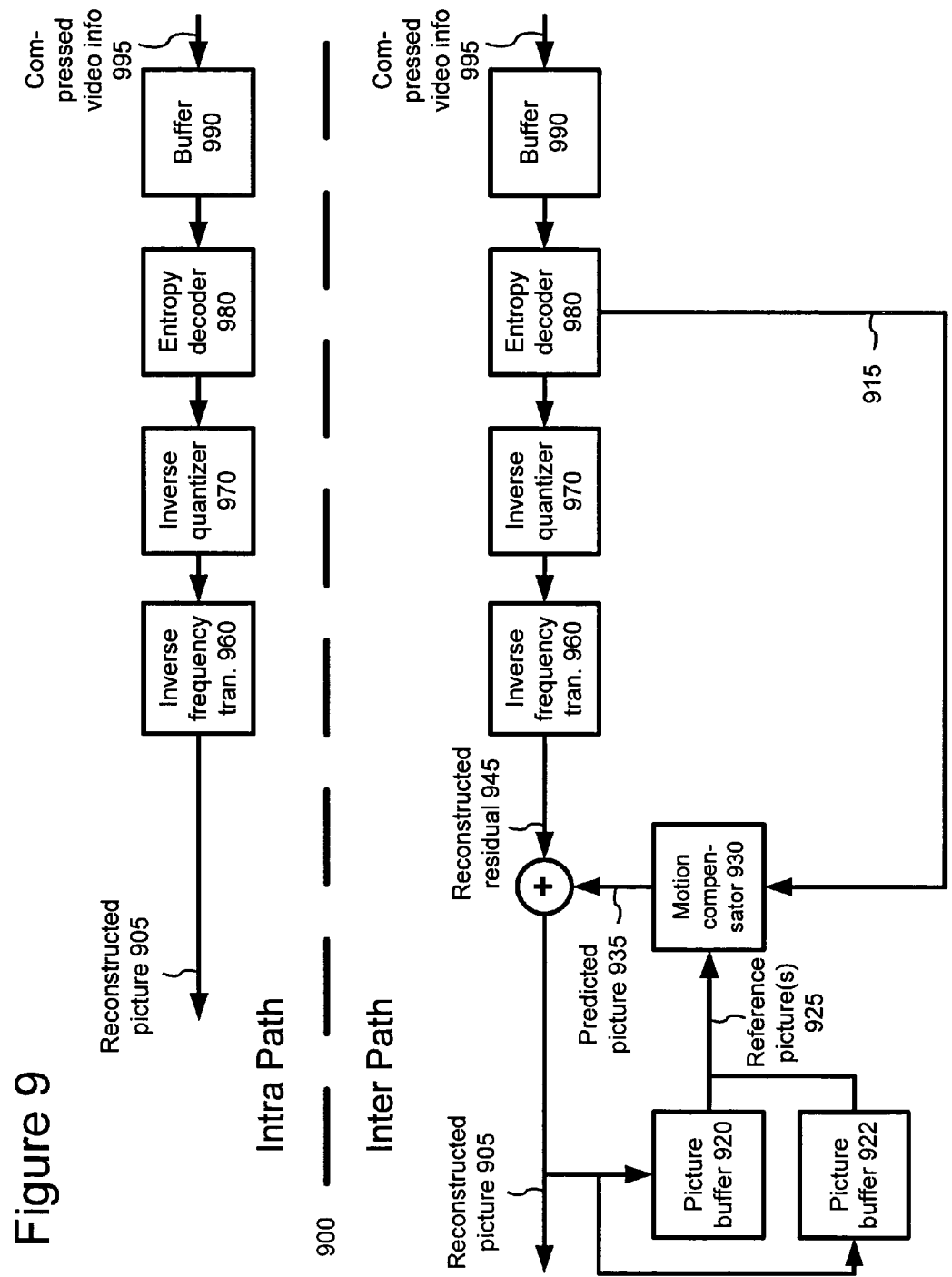
FIG. 9 is a block diagram of a generalized video decoder system in conjunction with which several described embodiments may be implemented.

FIG. 8 is a block diagram of a generalized video encoder 800 in conjunction with which some described embodiments may be implemented. FIG. 9 is a block diagram of a generalized video decoder 900 in conjunction with which some described embodiments may be implemented.

The relationships shown between modules within the encoder 800 and decoder 900 indicate general flows of information in the encoder and decoder; other relationships are not shown for the sake of simplicity. In particular, FIGS. 8 and 9 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 800 and decoder 900 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 800 and decoder 900 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 800 and decoder 900 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 1000 shown in FIG. 10. The macroblock 1000 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 11A:
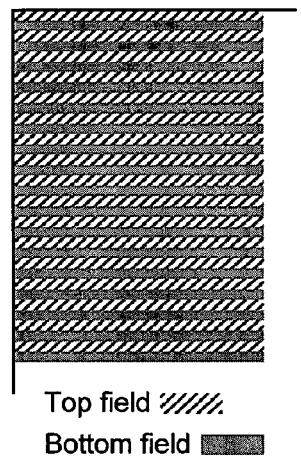
FIG. 11A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 11A shows part of an interlaced video frame 1100, including the alternating lines of the top field and bottom field at the top left part of the interlaced video frame 1100.

Figure 10:
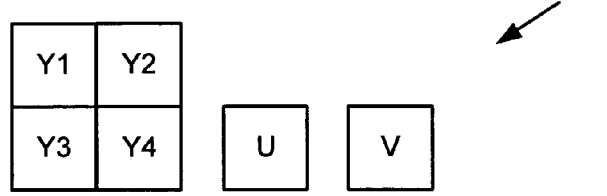
FIG. 10 is a diagram of a macroblock format used in several described embodiments.
Figure 11B:
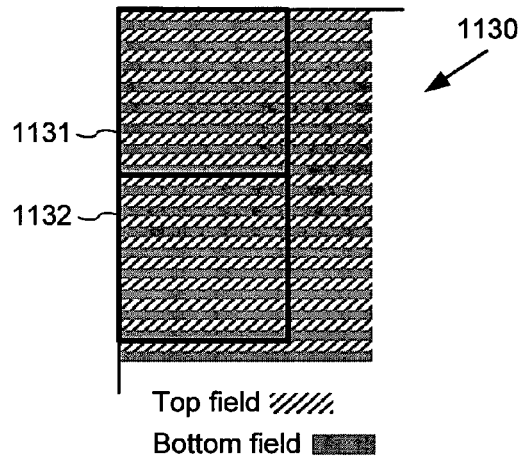
FIG. 11B is a diagram of the interlaced video frame organized for encoding/decoding as a frame.

FIG. 11B shows the interlaced video frame 1100 of FIG. 11A organized for encoding/decoding as a frame 1130. The interlaced video frame 1100 has been partitioned into macroblocks such as the macroblocks 1131 and 1132, which use a 4:2:0 format as shown in FIG. 10. In the luminance plane, each macroblock 1131, 1132 includes 8 lines from the top field alternating with 8 lines from the bottom field for 16 lines total, and each line is 16 pixels long. (The actual organization and placement of luminance blocks and chrominance blocks within the macroblocks 1131, 1132 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 11C:
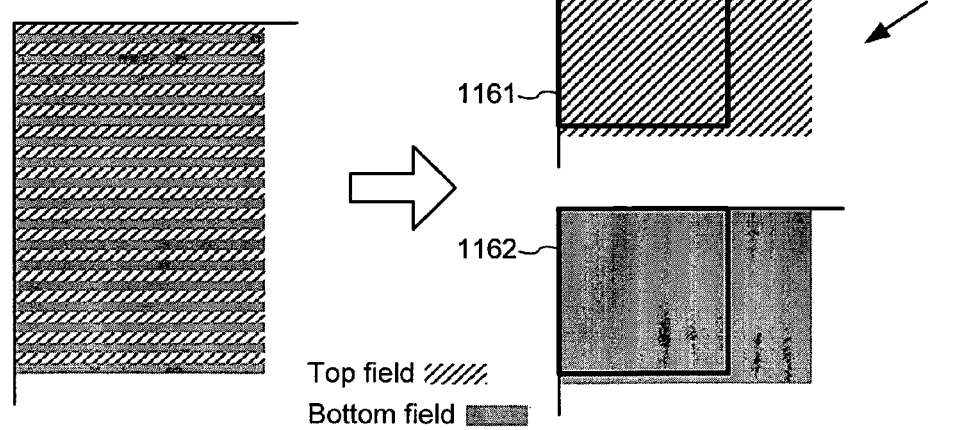
FIG. 11C is a diagram of the interlaced video frame organized for encoding/decoding as fields.

FIG. 11C shows the interlaced video frame 1100 of FIG. 11A organized for encoding/decoding as fields 1160. Each of the two fields of the interlaced video frame 1100 is partitioned into macroblocks. The top field is partitioned into macroblocks such as the macroblock 1161, and the bottom field is partitioned into macroblocks such as the macroblock 1162. (Again, the macroblocks use a 4:2:0 format as shown in FIG. 10, and the organization and placement of luminance blocks and chrominance blocks within the macroblocks are not shown.) In the luminance plane, the macroblock 1161 includes 16 lines from the top field and the macroblock 1162 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder 800 and decoder 900 are object-based, use a different macroblock or block format, or perform operations on sets of pixels of different size or configuration than 8×8 blocks and 16×16 macroblocks.

B. Video Encoder

FIG. 8 is a block diagram of a generalized video encoder system 800. The encoder system 800 receives a sequence of video pictures including a current picture 805 (e.g., progressive video frame, interlaced video frame, or field of an interlaced video frame), and produces compressed video information 895 as output. Particular embodiments of video encoders typically use a variation or supplemented version of the generalized encoder 800.

The encoder system 800 compresses predicted pictures and key pictures. For the sake of presentation, FIG. 8 shows a path for key pictures through the encoder system 800 and a path for predicted pictures. Many of the components of the encoder system 800 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 805 is a forward-predicted picture, a motion estimator 810 estimates motion of macroblocks or other sets of pixels of the current picture 805 with respect to one or more reference pictures, for example, the reconstructed previous picture 825 buffered in the picture store 820. If the current picture 805 is a bi-directionally-predicted picture, a motion estimator 810 estimates motion in the current picture 805 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 800 can use the separate stores 820 and 822 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004, which is hereby incorporated herein by reference.

The motion estimator 810 can estimate motion by pixel, ½ pixel, ¼ pixel, or other increments, and can switch the precision of the motion estimation on a picture-by-picture basis or other basis. The motion estimator 810 (and compensator 830) also can switch between types of reference picture pixel interpolation (e.g., between bicubic and bilinear) on a per-frame or other basis. The precision of the motion estimation can be the same or different horizontally and vertically. The motion estimator 810 outputs as side information motion information 815 such as differential motion vector information.

The motion compensator 830 applies the motion vectors to the reconstructed picture(s) 825 to form a motion-compensated current picture 835. The prediction is rarely perfect, however, and the differences between the motion-compensated current picture 835 and the original current picture 805 are the prediction residuals 845. During later reconstruction of the picture, the prediction residuals 845 are added to the motion compensated current picture 835 to obtain a reconstructed picture that is closer to the original current picture 805. In lossy compression, however, some information is still lost from the original current picture 805. Alternatively, a motion estimator and motion compensator apply another type of motion estimation/compensation.

A frequency transformer 860 converts the spatial domain video information into frequency domain (i.e., spectral) data. For block-based video pictures, the frequency transformer 860 applies a DCT, variant of DCT, or other block transform to blocks of the pixel data or prediction residual data, producing blocks of frequency transform coefficients. Alternatively, the frequency transformer 860 applies another conventional frequency transform such as a Fourier transform or uses wavelet or sub-band analysis. The frequency transformer 860 may apply an 8×8, 8×4, 4×8, 4×4 or other size frequency transform.

A quantizer 870 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 800 can use frame dropping, adaptive filtering, or other techniques for rate control.

The encoder 800 may use special signaling for a skipped macroblock, which is a macroblock that has no information of certain types.

When a reconstructed current picture is needed for subsequent motion estimation/compensation, an inverse quantizer 876 performs inverse quantization on the quantized spectral data coefficients. An inverse frequency transformer 866 then performs the inverse of the operations of the frequency transformer 860, producing a reconstructed prediction residual (for a predicted picture) or a reconstructed key picture. If the current picture 805 was a key picture, the reconstructed key picture is taken as the reconstructed current picture (not shown). If the current picture 805 was a predicted picture, the reconstructed prediction residual is added to the motion-compensated current picture 835 to form the reconstructed current picture. One or both of the picture stores 820, 822 buffers the reconstructed current picture for use in motion compensated prediction. In some embodiments, the encoder applies a de-blocking filter to the reconstructed frame to adaptively smooth discontinuities and other artifacts in the picture.

The entropy coder 880 compresses the output of the quantizer 870 as well as certain side information (e.g., motion information 815, quantization step size). Typical entropy coding techniques include arithmetic coding, differential coding, Huffman coding, run length coding, LZ coding, dictionary coding, and combinations of the above. The entropy coder 880 typically uses different coding techniques for different kinds of information (e.g., DC coefficients, AC coefficients, different kinds of side information), and can choose from among multiple code tables within a particular coding technique.

The entropy coder 880 provides compressed video information 895 to the multiplexer ["MUX"] 890. The MUX 890 may include a buffer, and a buffer level indicator may be fed back to bit rate adaptive modules for rate control. Before or after the MUX 890, the compressed video information 895 can be channel coded for transmission over the network. The channel coding can apply error detection and correction data to the compressed video information 895.

C. Video Decoder

FIG. 9 is a block diagram of a general video decoder system 900. The decoder system 900 receives information 995 for a compressed sequence of video pictures and produces output including a reconstructed picture 905 (e.g., progressive video frame, interlaced video frame, or field of an interlaced video frame). Particular embodiments of video decoders typically use a variation or supplemented version of the generalized decoder 900.

The decoder system 900 decompresses predicted pictures and key pictures. For the sake of presentation, FIG. 9 shows a path for key pictures through the decoder system 900 and a path for forward-predicted pictures. Many of the components of the decoder system 900 are used for decompressing both key pictures and predicted pictures. The exact operations performed by those components can vary depending on the type of information being decompressed.

A DEMUX 990 receives the information 995 for the compressed video sequence and makes the received information available to the entropy decoder 980. The DEMUX 990 may include a jitter buffer and other buffers as well. Before or after the DEMUX 990, the compressed video information can be channel decoded and processed for error detection and correction.

The entropy decoder 980 entropy decodes entropy-coded quantized data as well as entropy-coded side information (e.g., motion information 915, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 980 typically uses different decoding techniques for different kinds of information (e.g., DC coefficients, AC coefficients, different kinds of side information), and can choose from among multiple code tables within a particular decoding technique.

The decoder 900 decodes the motion information 915 by, for example, computing one or more predictors for motion vectors, entropy decoding differential motion vectors, and combining decoded differential motion vectors with predictors to reconstruct motion vectors.

A motion compensator 930 applies motion information 915 to one or more reference pictures 925 to form a prediction 935 of the picture 905 being reconstructed. For example, the motion compensator 930 uses one or more macroblock motion vector to find macroblock(s) in the reference picture(s) 925. One or more picture stores (e.g., picture store 920, 922) store previous reconstructed pictures for use as reference pictures. Typically, B-pictures have more than one reference picture (e.g., at least one temporally previous reference picture and at least one temporally future reference picture). Accordingly, the decoder system 900 can use separate picture stores 920 and 922 for multiple reference pictures. The motion compensator 930 can compensate for motion at pixel, ½ pixel, ¼ pixel, or other increments, and can switch the precision of the motion compensation on a picture-by-picture basis or other basis. The motion compensator 930 also can switch between types of reference picture pixel interpolation (e.g., between bicubic and bilinear) on a per-frame or other basis. The precision of the motion compensation can be the same or different horizontally and vertically. Alternatively, a motion compensator applies another type of motion compensation. The prediction by the motion compensator is rarely perfect, so the decoder 900 also reconstructs prediction residuals.

An inverse quantizer 970 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 960 converts the quantized, frequency domain data into spatial domain video information. For block-based video pictures, the inverse frequency transformer 960 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 960 applies another conventional inverse frequency transform such as an inverse Fourier transform or uses wavelet or sub-band synthesis. The inverse frequency transformer 960 may apply an 8×8, 8×4, 4×8, 4×4, or other size inverse frequency transform.

For a predicted picture, the decoder 900 combines the reconstructed prediction residual 945 with the motion compensated prediction 935 to form the reconstructed picture 905. When the decoder needs a reconstructed picture 905 for subsequent motion compensation, one or both of the picture stores (e.g., picture store 920) buffers the reconstructed picture 905 for use in predicting the next picture. In some embodiments, the decoder 900 applies a de-blocking filter to the reconstructed picture to adaptively smooth discontinuities and other artifacts in the picture.

III. Bitplane Coding

In some implementations, macroblock-specific binary information can be coded as a bitplane and transmitted at a level higher than macroblock level in a bitstream (e.g., frame level, field level, or some other level). An encoder can select from among several coding modes, based on, for example, the relative efficiency of the different coding modes for encoding certain kinds of data. Bitplane coding techniques take advantage of the spatial correlation of certain kinds of binary information among macroblocks in a frame or field. When combined with macroblock-level signaling, described techniques and tools provide flexible and efficient signaling of macroblock-specific information.

In some implementations, an encoder uses the INVERT, IMODE and DATABITS syntax elements for bitplane coding, as described below.

The INVERT element is a one-bit code that indicates whether the bitplane has more bits equal to 0 or more bits equal to 1. Depending on INVERT and the bitplane coding mode, the decoder may invert the decoded bitplane to recreate the original. The IMODE element is a VLC representing the bitplane coding mode. In general, shorter codes are used to encode more frequently occurring coding modes. The DATABITS element is an entropy-coded stream of symbols based on the coding mode signaled in the IMODE element. For example, binary information for macroblocks in a frame or field can be coded as two-dimensional arrays and transmitted in a frame or field header. The size of each array is rowMB×colMB, where rowMB and colMB are the number of macroblock rows and columns, respectively, in the frame or field.

In some embodiments, each array is coded as a set of consecutive bits (e.g., representing macroblocks in raster scan order) in one of seven bitplane coding modes. The seven bitplane coding modes are described below.

Row-Skip Mode

In Row-skip mode, the ROWSKIP element indicates whether the ROWBITS element is present for each row in the bitplane. If an entire row of values in the bitplane is zero, ROWSKIP=0 and ROWBITS is skipped. If at least one value in the row is non-zero, ROWSKIP=1 and ROWBITS contains one bit for each value in the row.

Column-Skip Mode

In Column-skip mode, the COLUMNSKIP element indicates whether the COLUMNBITS element is present for each column in the bitplane. If an entire column of values in the bitplane is zero, COLUMNSKIP=0 and COLUMNBITS is skipped. If at least one value in the column is non-zero, COLUMNSKIP=1 and COLUMNBITS contains one bit for each value in the column.

Normal-2 Mode

In Normal-2 mode, if rowMB×colMB is odd, the first symbol is represented with one bit matching the first symbol's value, and subsequent symbols are encoded in pairs using a VLC table.

Normal-6 Mode

In Normal-6 mode, the bitplane is encoded in groups of six pixels in either 2×3 or 3×2 tiles. The bitplane is grouped into 2×3 and 3×2 tiles using a set of tiling rules, and the remaining pixels (if any) are encoded using a variant of the Row-skip and Column-skip modes. If the array size is a multiple of 3×2 or of 2×3, the bitplane is tiled with only six-element rectangular tiles. 3×2 "vertical" tiles are used if and only if rowMB is a multiple of three and colMB is not. Otherwise, 2×3 "horizontal" tiles are used. The six-element rectangular tiles are encoded using a combination of variable-length and fixed-length codes.

Diff-2 and Diff-6 Modes

If either differential mode (Diff-2 or Diff-6) is used, a bitplane of "differential bits" is decoded using the corresponding normal mode (Normal-2 or Normal-6, respectively). The differential bits are used to regenerate the original bitplane.

The regeneration process is a 2-D DPCM on a binary alphabet. In order to regenerate the bit at location (i, j), the predictor $b_p(i,j)$ is generated as follows (from bits b(i, j) at positions (i, j)):

$$b_p(i, j) = \begin{cases} A & i = j = 0, \text{ or } b(i, j-1) \neq b(i-1, j) \\ b(0, j-1) & i = 0 \\ b(i-1, j) & \text{otherwise} \end{cases}$$

For the differential coding mode, the bitwise inversion process based on INVERT is not performed. However, the INVERT flag is used in a different capacity to indicate the value of the symbol A for the derivation of the predictor shown above. More specifically, A=0 if INVERT=0 and A=1 if INVERT=1. The actual value of the bitplane is obtained by xor'ing the predictor with the decoded differential bit value. In the above equation, b(i,j) is the bit at the i,jth position after final decoding (i.e. after doing Norm-2/Norm-6, followed by differential xor with its predictor).

Raw Mode

Raw mode encodes the macroblock-specific binary information with one bit per binary symbol. Although Raw mode bits can be encoded at frame or field level in an uncompressed bitplane, Raw mode bits also can be encoded one at a time for each macroblock at the same layer in the bitstream as the rest of the macroblock level information for the macroblock.

Other modes encode bitplanes at frame or field level and use a second pass through the frame or field during encoding. For example, the encoder collects the binary information for each macroblock (e.g., AC prediction status) at macroblock level in the first pass, and encodes the macroblock-specific information at frame or field level in the second pass. However, in low-latency situations, avoiding the second pass can be beneficial. Thus, the ability to switch coding of binary information from frame or field level to macroblock level provides additional flexibility.

In some implementations, an encoder uses raw mode for slice-coded frames. A slice represents one or more contiguous rows of macroblocks. With respect to spatial prediction, the first row of macroblocks in the slice is generally treated as the first row of macroblocks in a picture. When slices are used, information that is usually represented in a bitplane at picture layer is signaled in raw mode at macroblock layer, so that each macroblock carries its own local information.

In addition to the bitplane coding modes described above, other bitplane coding modes can be used. For example, an encoder can encode a bitplane in arbitrarily sized groups of pixels. In a variation of the Normal-6 mode, an encoder can employ a "largest rectangles" mode, such as when binary information in the bitplane is a arranged in a predictable pattern. The encoder can group the bitplane into tiles of arbitrary size using a different set of tiling rules. The tiles can then be encoded using a combination of variable-length and fixed-length codes, or some other coding arrangement.

For more information on bitplane coding in some implementations, see Sections IV, V and VI, below.

IV. Innovations in Field/Frame Type Signaling for Interlaced Frame Coded Pictures Described embodiments include techniques and tools for signaling field/frame type information in interlaced frame coded pictures (e.g., interlaced I-frames, interlaced P-frames, interlaced B-frames, etc.). For example, described techniques and tools include an encoder capable of using either frame-level bitplane coding or macroblock-level coding to encode field/frame type information. A decoder performs corresponding decoding. The described techniques and tools can be used in combination with one another or with other techniques and tools, or can be used independently.

In general, field-coded macroblocks are more efficient when high inter-field motion is present, and frame-coded macroblocks are more efficient when lower motion is present. An encoder can choose a field/frame type for a given macroblock and indicate whether it is frame-coded or field-coded in the bitstream. The field/frame type of a macroblock indicates the internal organization of a macroblock. Referring again to FIG. 6, in field coding, an interlaced macroblock 610 is permuted such that all the top field lines (e.g., even-numbered lines 0, 2, . . . 14) in the luminance blocks are placed in the top half of the field-coded macroblock 620, and all the bottom field lines (e.g., odd-numbered lines 1, 3, . . . 15) in the luminance blocks are placed in the bottom half of the field-coded macroblock. For a frame-coded macroblock, the top field lines and bottom field lines alternate throughout the macroblock, as in interlaced macroblock 610. Chrominance blocks remain interlaced for both field-coded macroblocks and frame-coded macroblocks.

Accordingly, in some implementations an encoder selects a one bit per macroblock mode from among several coding modes and sends a single bit (e.g., the FIELDTX flag) at macroblock level for each macroblock in a frame for which the mode decision is made to explicitly inform the decoder whether the macroblock is field-coded or frame-coded. The ability to select either a macroblock-level, one bit per macroblock mode or a frame-level, compressed bitplane mode provides additional flexibility in encoding such information.

In particular, macroblock-level signaling may be efficient when a field/frame coding mode decision bit is signaled for some, but not all, of the macroblocks of a frame. For example, in an interlaced P-frame, the field/frame decision bit is signaled for intra macroblocks but not inter macroblocks (for which the field/frame decision bit is otherwise signaled). Bitplane coding in such a context results in signaling of extraneous information. On the other hand, in some frames, each macroblock has a field/frame decision bit. Grouping field/frame type bits together and coding them in a frame-level bitplane can take advantage of spatial correlation in field/frame type that may exist among macroblocks in the frame.

Figure 12:
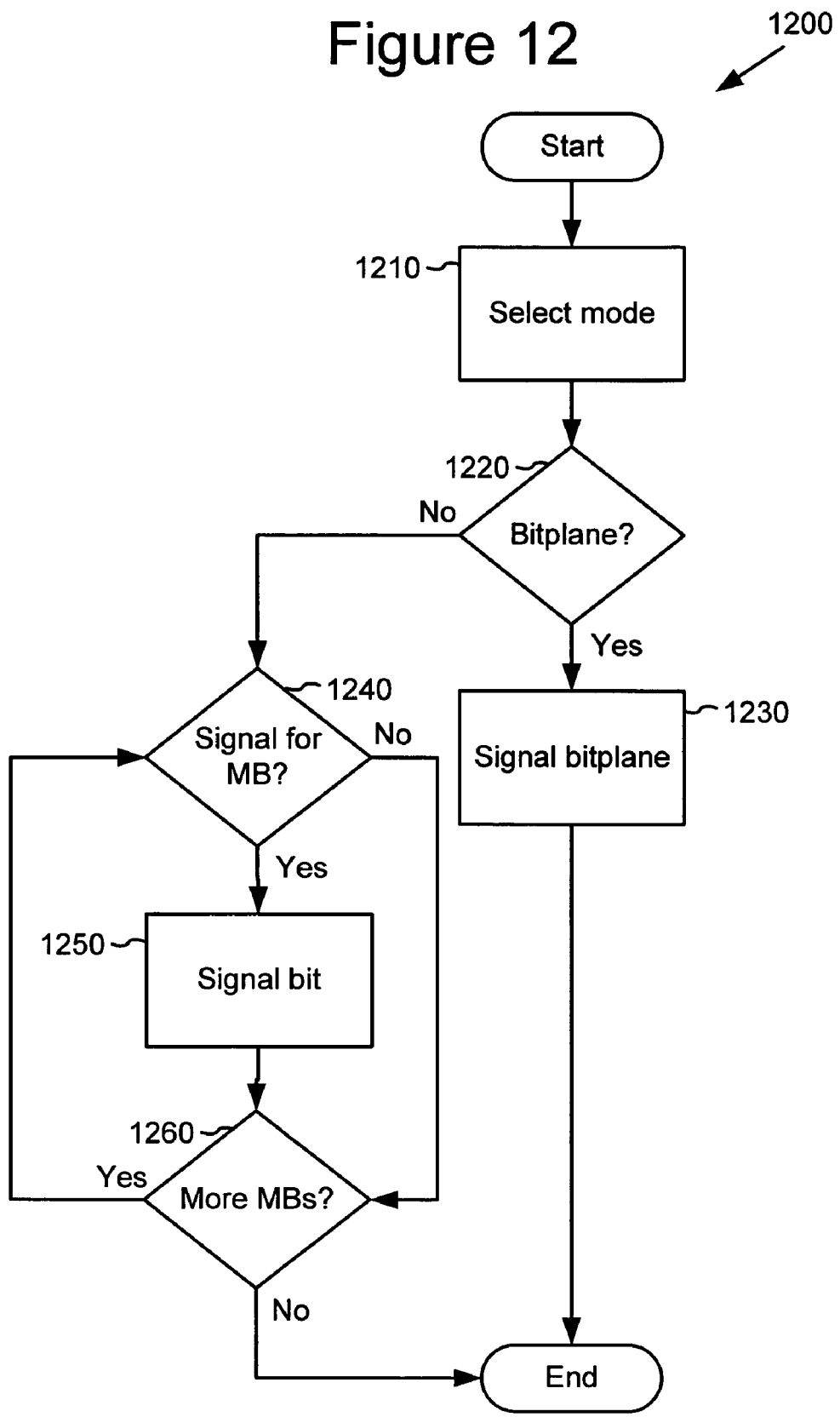
FIG. 12 is a flow chart showing a technique for signaling field/frame type information for macroblocks using either frame-level bitplane coding or macroblock-level coding.

For example, FIG. 12 shows a technique 1200 for signaling field/frame type information for macroblocks using either bitplane coding or macroblock-level coding. An encoder selects a coding mode at 1210. At 1220, if the coding mode is a bitplane coding mode, the encoder signals field/frame type information as a bitplane at 1230. Otherwise, the encoder determines at 1240 whether to send a signal bit (at 1250) to indicate a field/frame decision for the macroblock. At 1260, if there are more macroblocks for which a signaling decision is to be made, the encoder determines whether send signal bits for those macroblocks. A decoder performs corresponding decoding.

For example, in one implementation, FIELDTX is a 1-bit syntax element present in all interlaced I-frame macroblocks and interlaced BI-frame macroblocks, and in intra coded macroblocks in interlaced P- and B-frames. FIELDTX=1 indicates that the macroblock is field coded, and FIELDTX=0 indicates that the macroblock is frame coded. FIELDTX bits can be bitplane coded at frame level in the bitstream, or signaled at macroblock level on a one bit per macroblock basis for some or all macroblocks. For example, in interlaced I-frames and interlaced BI-frames, FIELDTX bits are bitplane coded at frame level in the bitstream, or at macroblock level on a one bit per macroblock basis. In interlaced P-frames and interlaced B-frames, FIELDTX bits are sent for intra macroblocks at macroblock level on a one bit per macroblock basis.

Alternatively, field/frame type is signaled differently. For example, field/frame type can be signaled (e.g., at macroblock level) with bitstream elements of different sizes or arrangements. As another alternative, field/frame type can be signaled at a level below frame level other than macroblock level (e.g., slice level or some other level). As another alternative, field/frame type can be selectively signaled at macroblock level (or some other level) for less than all macroblocks in an intra coded frame.

V. Innovations in AC Prediction Signaling for Progressive and Interlaced Pictures Described embodiments include techniques and tools for signaling AC prediction information in progressive and interlaced pictures (e.g., progressive I-frames, interlaced I-frames, etc.). For example, described techniques and tools include techniques and tools for signaling the use of AC prediction in macroblocks in a frame or field using bitplane coding. The described techniques and tools can be used in combination with one another or with other techniques and tools, or can be used independently.

For example, an encoder/decoder predicts AC coefficients prior to entropy coding. The encoder subtracts from AC coefficient values in the current block the corresponding AC coefficient values in a neighboring predictor block to obtain AC coefficient differentials. The differentials are then entropy encoded. Depending on prediction direction, the predictor block is either the block immediately above or the block to the left of the current block. Referring again to FIG. 1B, for top prediction the top row 177 of AC coefficients in the block 175 immediately above the current block is used as the predictor for the top row 129 of AC coefficients in the current block 125. For left prediction, the leftmost column 137 of AC coefficients in the block 135 to the immediate left of the current block is used as the predictor for the leftmost column of AC coefficients in the current block 125. In one implementation, a prediction direction chosen for DC coefficient prediction is used as the prediction direction for the AC coefficient prediction. Alternatively, a direction of AC prediction is also signaled.

The precise mechanics of the AC prediction may be different for different picture types. In its simplest form, AC prediction involves simply using the top row or left column AC coefficients of a neighbor block as coefficient predictors. In more complex AC prediction, the coefficient predictors are scaled by a factor relating to levels of quantization in the current block and neighbor block. Alternatively, the encoder and decoder use AC prediction with other mechanics.

If a block does not exist in the specified prediction direction, the predicted values for all seven AC coefficients in the leftmost column or top row are set to zero. For example, if the prediction direction is up and the current block is in the top row, each of the predicted AC coefficients in the top row of the current block are set to zero because there is no adjacent block in the up direction. The AC coefficients in the predicted row or column are added to the corresponding decoded AC coefficients (which are differentials) in the current block to produce the fully reconstructed quantized transform coefficient block.

Performing AC coefficient prediction for all macroblocks in a frame or field can be inefficient; the prediction will be ineffective in some macroblocks. So, the encoder/decoder uses signaling to indicate whether AC prediction is enabled or disabled for individual macroblocks in a frame or field. A single bit of information can be sent for each macroblock at macroblock-level to explicitly inform the decoder whether AC prediction is used in the macroblock. However, an encoder/decoder that signals AC prediction only by sending one bit per macroblock can not take advantage of possible spatial correlation in AC prediction status for macroblocks in the field or frame.

Accordingly, in some implementations an encoder/decoder exploits such spatial correlation in a frame or field by grouping AC prediction information for individual macroblocks together and coding the information as a bitplane (e.g., at frame level, field level, or some other level above macroblock level). In one implementation, the bitplane is the frame-level/field-level bitplane ACPRED. The ACPRED bitplane is described in further detail in Section VII, below.

Figure 13:
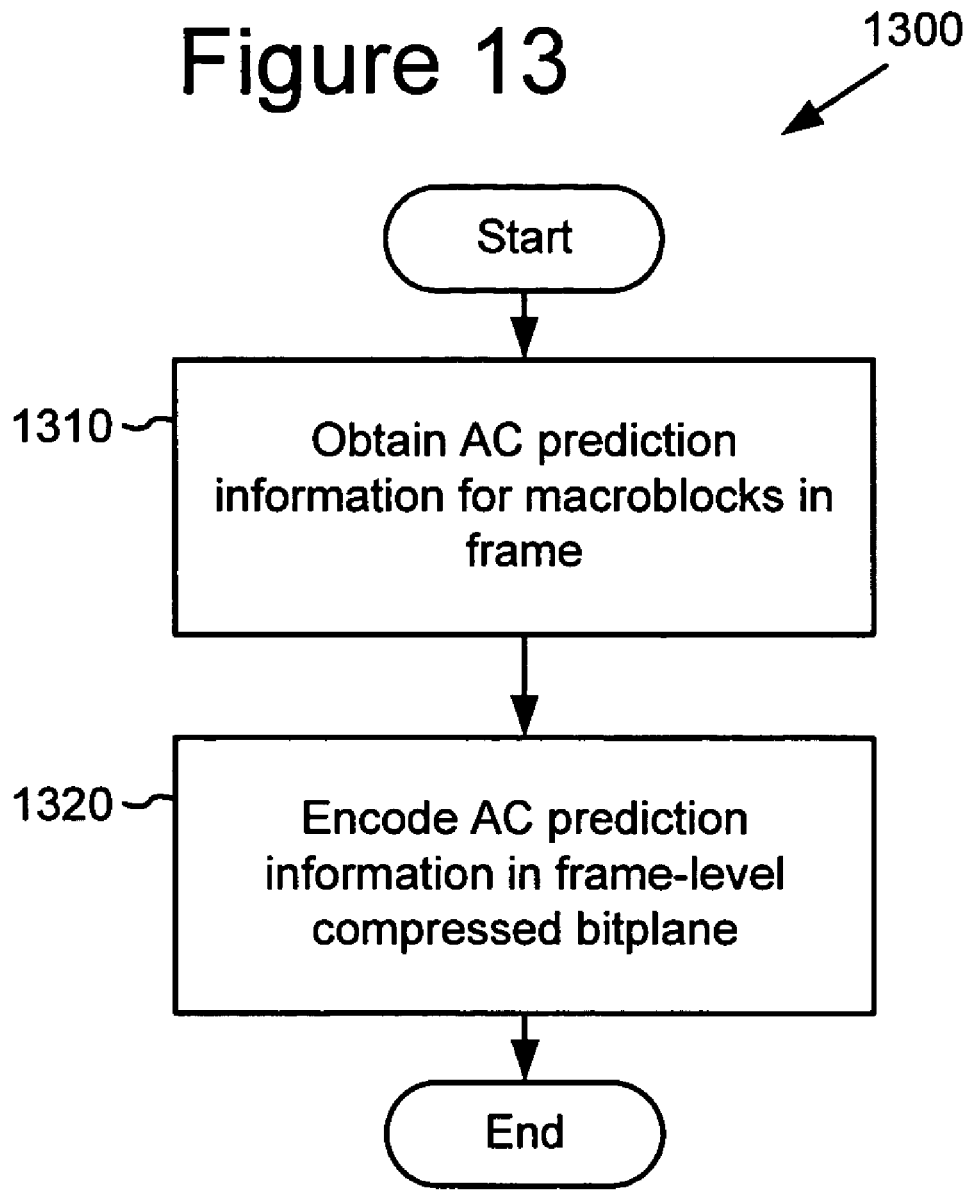
FIG. 13 is a flow chart showing a technique for bitplane coding of AC prediction information.

FIG. 13 shows a technique 1300 for bitplane coding or decoding of AC prediction information. At 1310, an encoder/decoder selects a coding mode from a group of plural available coding modes. At 1320, the encoder/decoder processes a bitplane according to the selected coding mode, the bitplane comprising binary information that signifies whether macroblocks in a video frame are encoded using AC prediction.

The described bitplane coding techniques also can be used in combination with macroblock-level, one bit per macroblock coding. For example, in one implementation the ACPRED syntax element when signaled in a macroblock layer indicates whether AC prediction is used for the blocks in that macroblock. When ACPRED=1, AC coefficients in decoded blocks of the macroblock are treated as differential values based on the coefficients in a predictor block. The macroblock-level ACPRED bitstream element is described in further detail in Section VII, below.

Alternatively, AC prediction information is signaled differently. For example, AC prediction information can be signaled with bitstream elements of different sizes or arrangements. As another alternative, AC prediction information can be encoded in a bitplane at a level above macroblock level other than frame level or field level (e.g., slice level or some other level). As another alternative, AC prediction information can be selectively signaled at macroblock level (or some other level) for less than all macroblocks in an intra coded frame, with bitplane coding (or some other coding technique) potentially used at frame level (or some other level) for signaling field/frame type for macroblocks not signaled at macroblock level.

VI. Combined Implementations

A detailed combined implementation for a bitstream syntax, semantics, and decoder are now described, in addition to an alternative combined implementation with minor differences from the main combined implementation.

A. Bitstream Syntax

In various combined implementations, data is presented in the form of a bitstream having plural layers (e.g., sequence, entry point, frame, field, slice, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Sequence-level elements are used to decode a sequence of compressed video pictures. Sequence-level data can affect the interpretation or presence of elements at other levels (e.g., entry point level, frame level, macroblock level, etc.) In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools for frames following an entry point).

Figure 14:
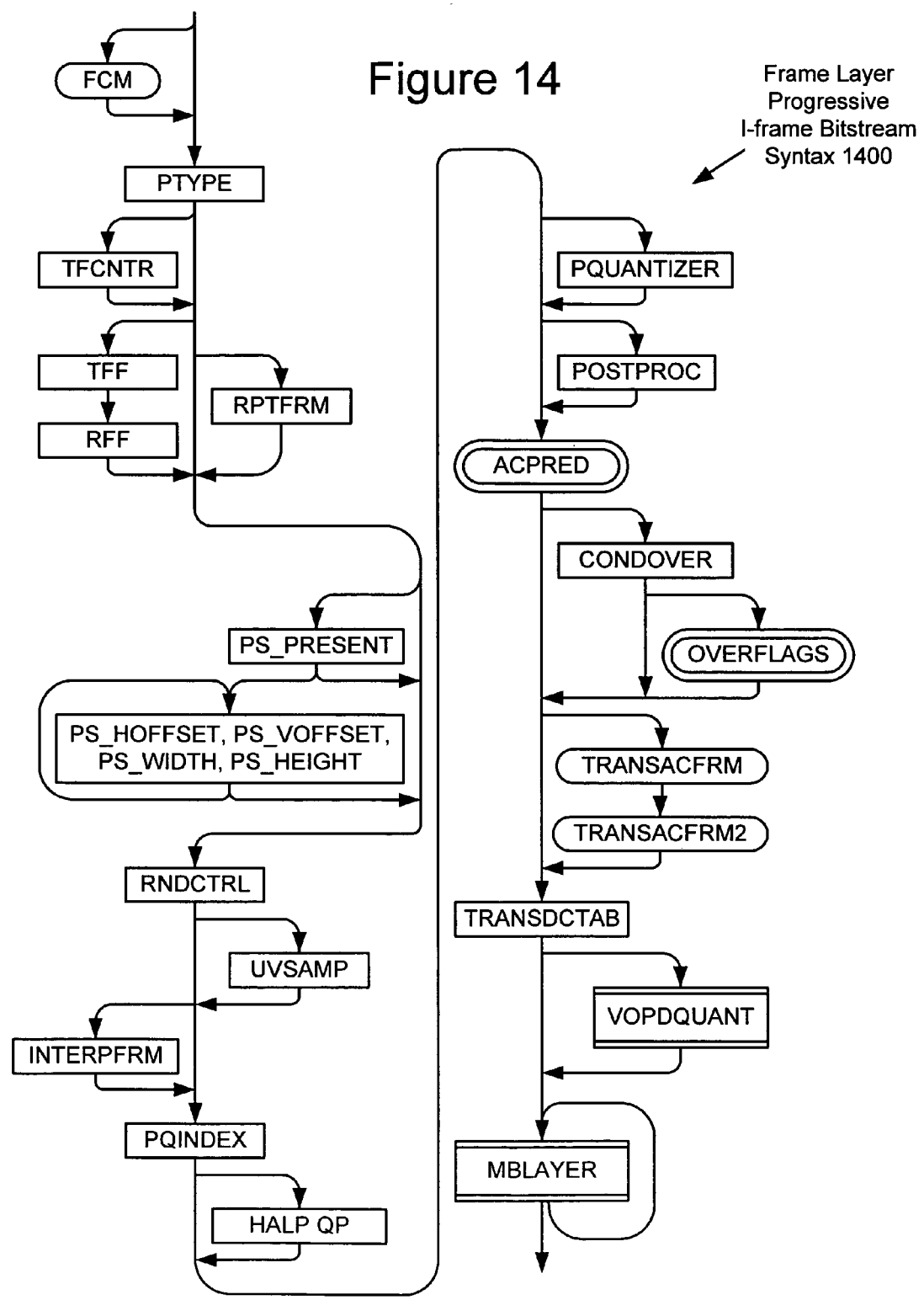
FIG. 14 is a diagram showing a frame-layer bitstream syntax for progressive I-frames in a combined implementation.
Figure 15:
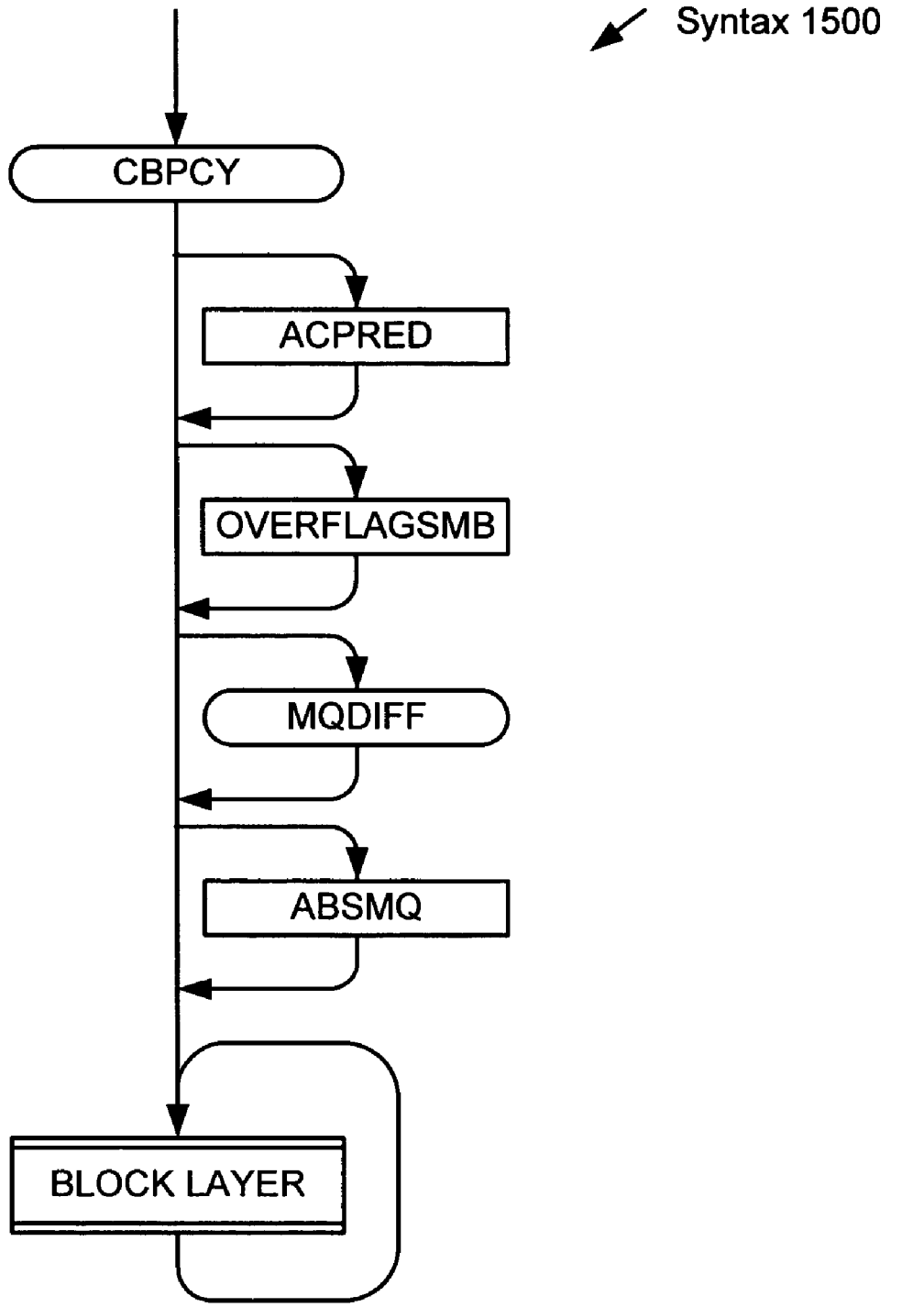
FIG. 15 is a diagram showing a macroblock-layer bitstream syntax for progressive I-frames in a combined implementation.

For progressive I-frames, frame-level bitstream elements are shown in FIG. 14. (Frame-level bitstream elements for progressive BI-frames are identical to those for progressive I-frames.) Data for each frame consists of a frame header followed by data for the macroblock layer (for intra macroblocks). Macroblock-level bitstream elements for progressive I-frames are shown in FIG. 15.

Figure 16:
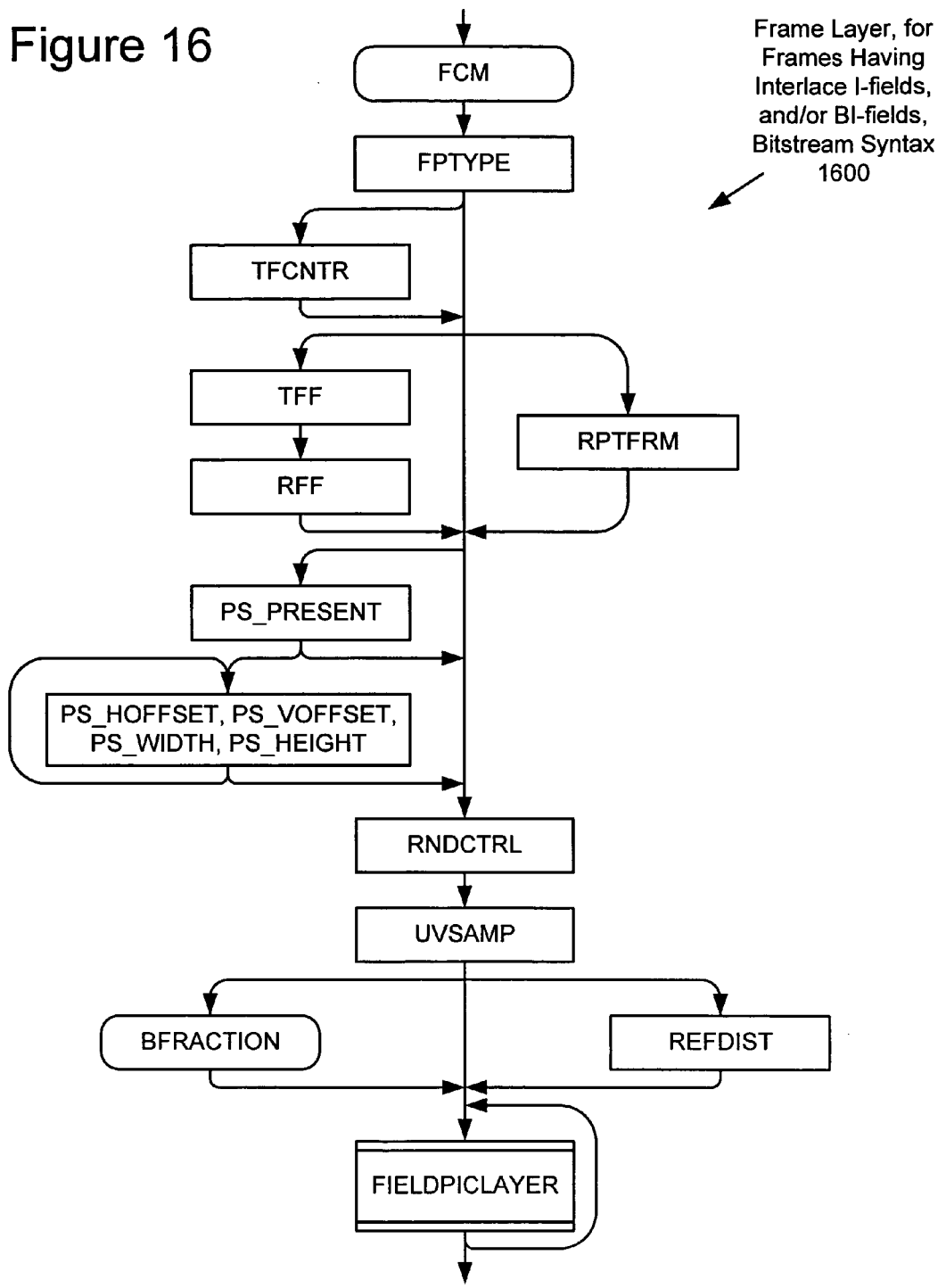
FIG. 16 is a diagram showing a frame-layer bitstream syntax for interlaced I-fields or BI-fields in a combined implementation.
Figure 17:
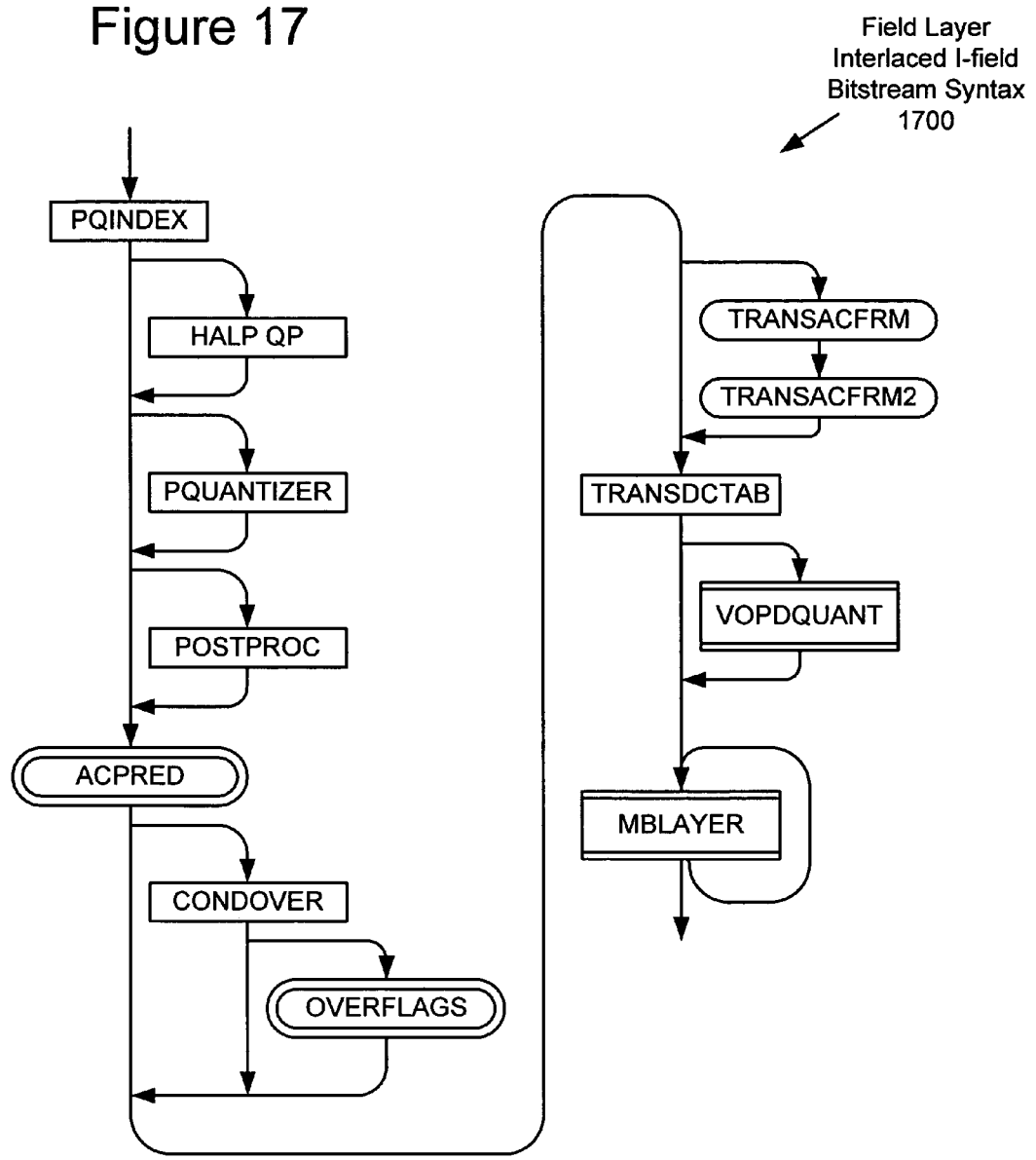
FIG. 17 is a diagram showing a field-layer bitstream syntax for interlaced I-fields in a combined implementation.

For interlaced video frames with interlaced I-fields and/or BI-fields, frame-level bitstream elements are shown in FIG. 16. Data for each frame consists of a frame header followed by data for the field layers (shown as the repeated "FieldPicLayer" element per field). The bitstream elements that make up the field headers for interlaced I-fields are shown in FIG. 17. (Field-level bitstream elements for interlaced BI-fields are identical to those for interlaced I-fields.) The bitstream elements that make up the macroblock layer for interlaced I-fields and interlaced BI-fields are identical to those for macroblocks in progressive I-frames.)

Figure 18:
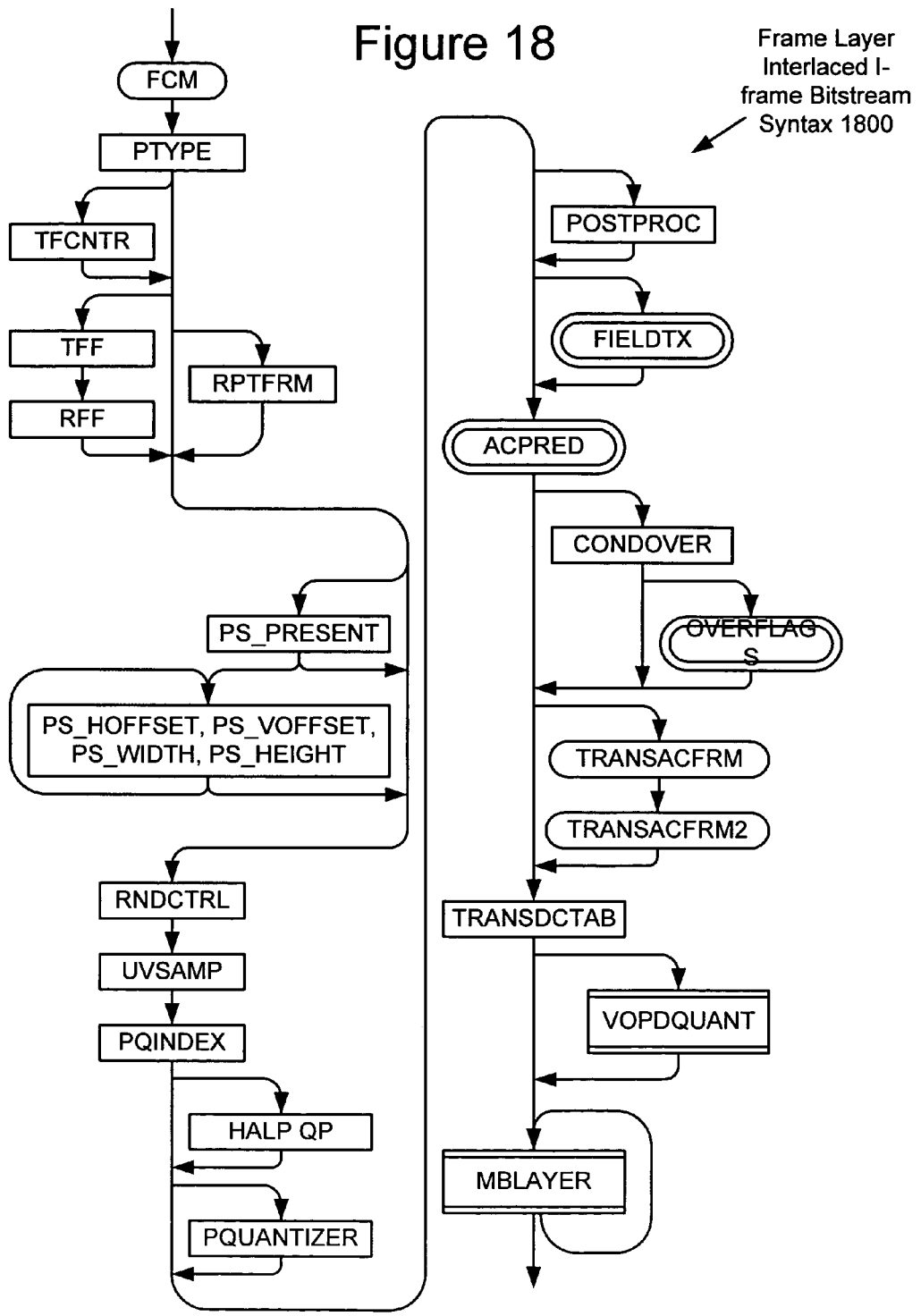
FIG. 18 is a diagram showing a frame-layer bitstream syntax for interlaced I-frames in a combined implementation.
Figure 19:
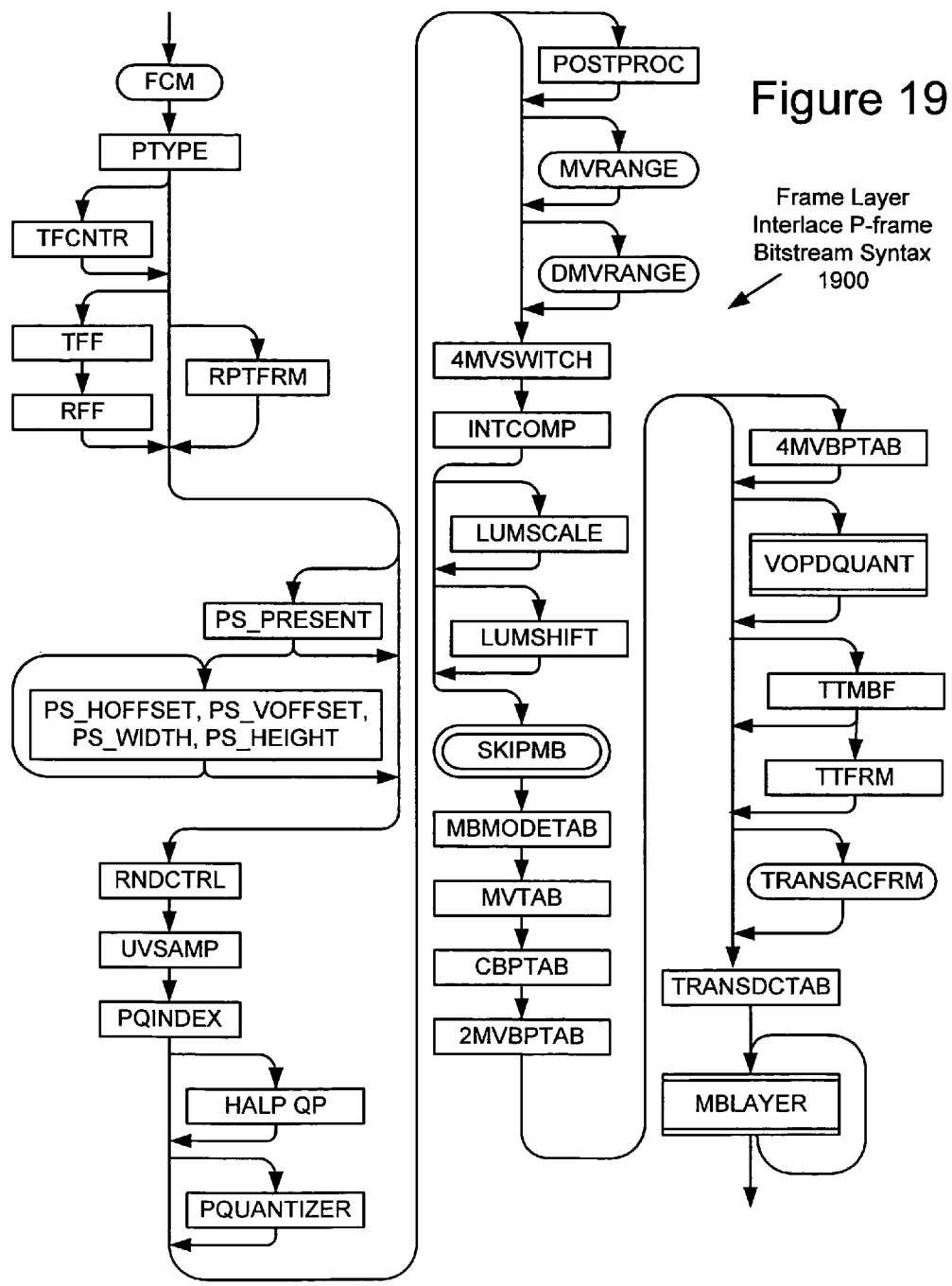
FIG. 19 is a diagram showing a frame-layer bitstream syntax for interlaced P-frames in a combined implementation.
Figure 20:
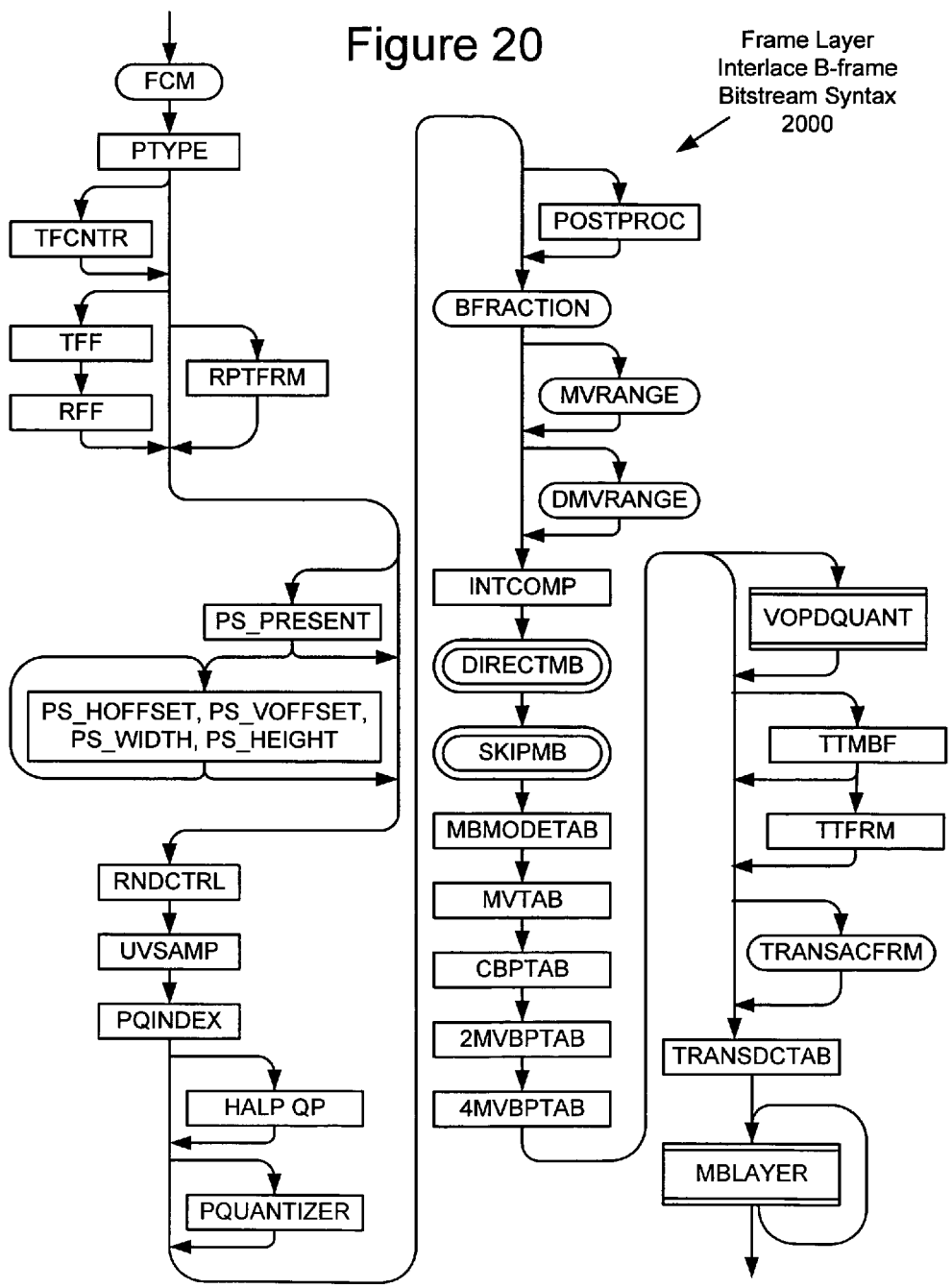
FIG. 20 is a diagram showing a frame-layer bitstream syntax for interlaced B-frames in a combined implementation.
Figure 21:
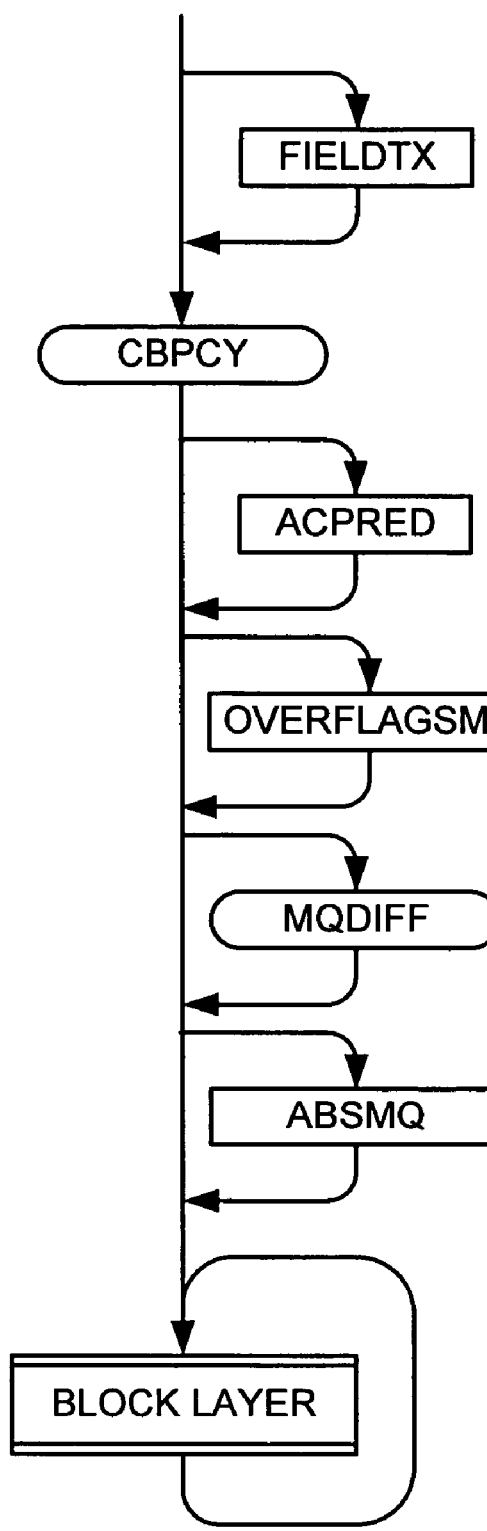
FIG. 21 is a diagram showing a macroblock-layer bitstream syntax for macroblocks of interlaced I-frames in a combined implementation.
Figure 22:
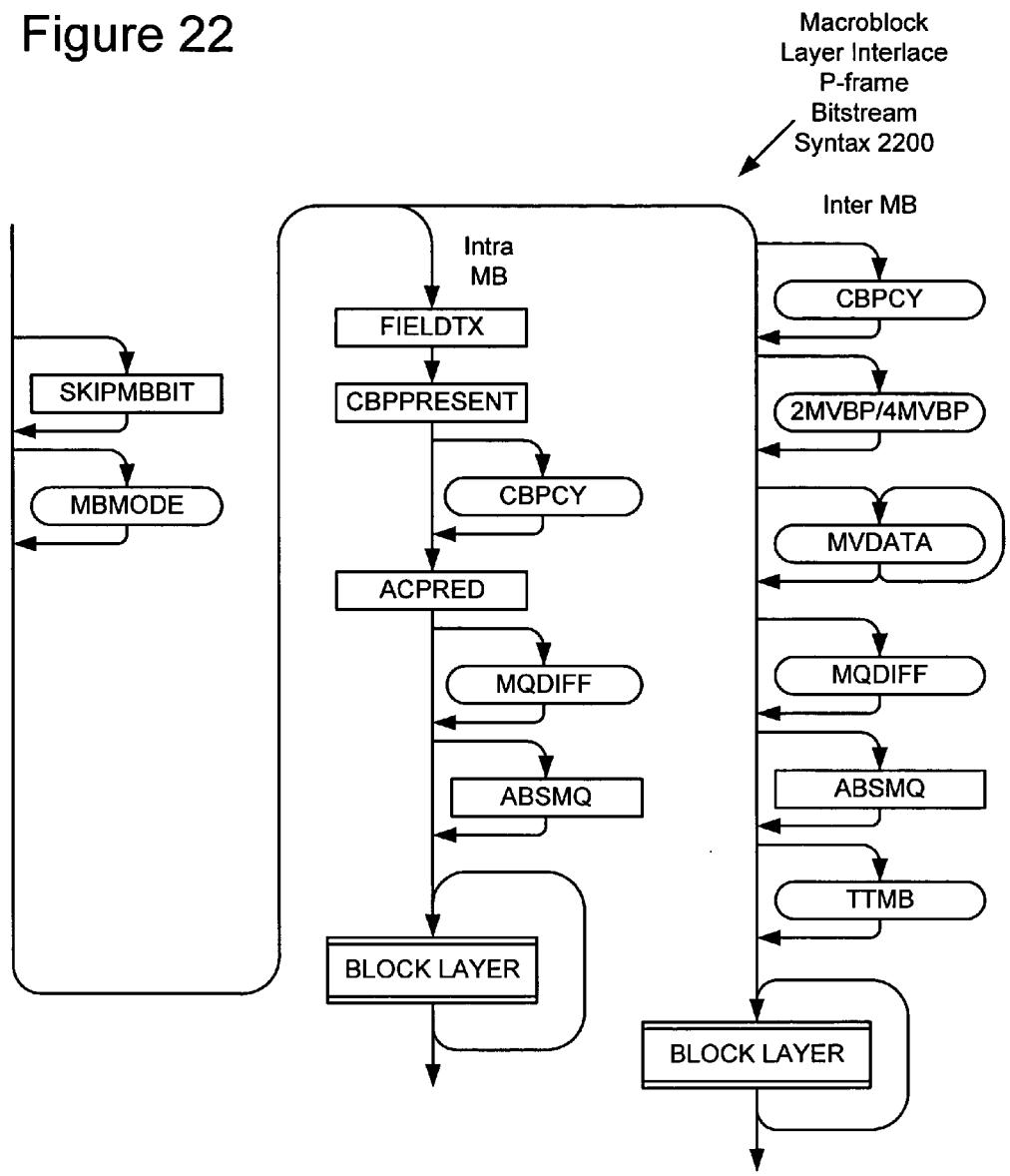
FIG. 22 is a diagram showing a macroblock-layer bitstream syntax for macroblocks of interlaced P-frames in a combined implementation.
Figure 23:
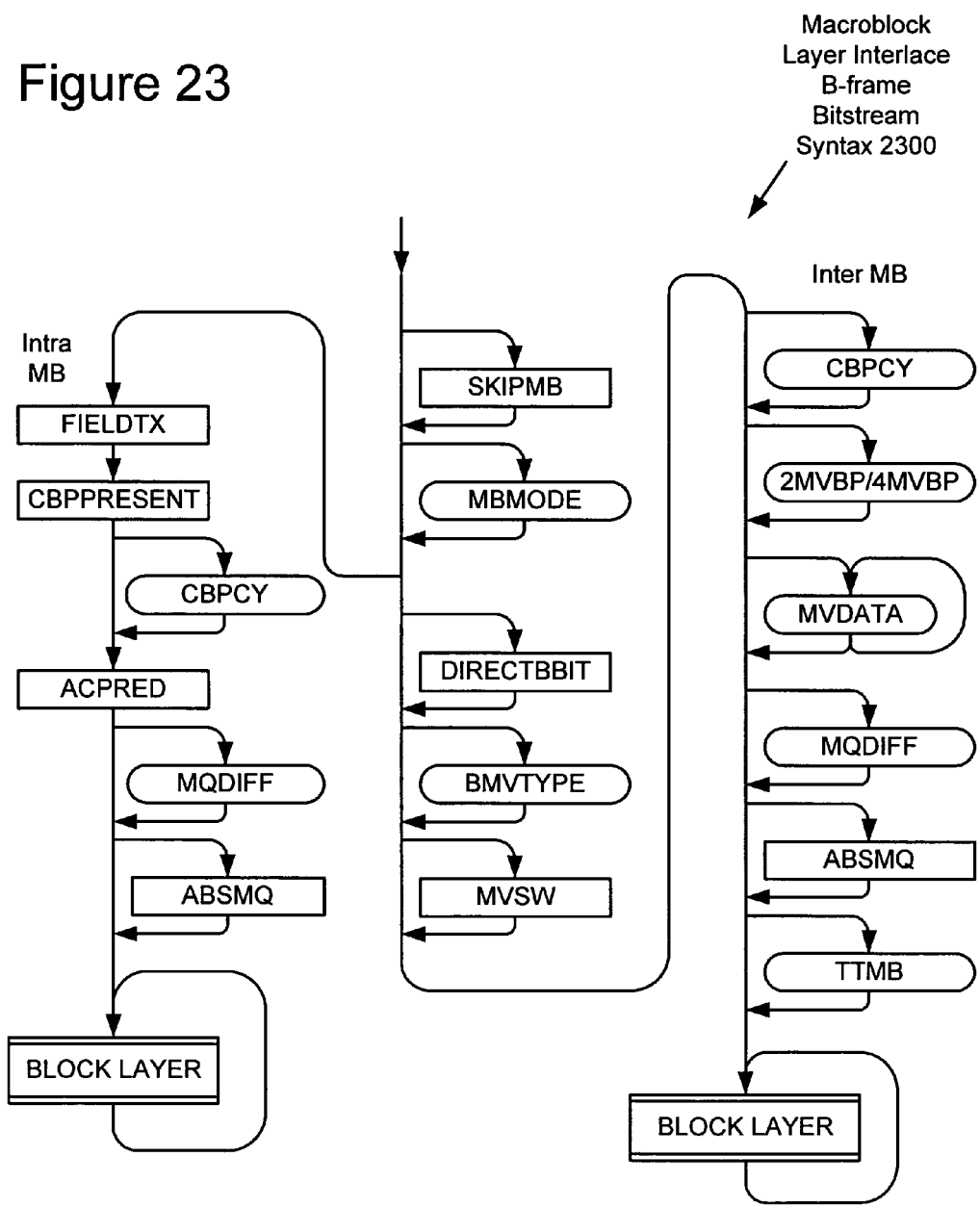
FIG. 23 is a diagram showing a macroblock-layer bitstream syntax for macroblocks of interlaced B-frames in a combined implementation.

For interlaced I-frames, P-frames, and B-frames, frame-level bitstream elements are shown in FIGS. 18, 19, and 20, respectively. (Frame-level bitstream elements for interlaced BI-frames are identical to those for interlaced I-frames.) In interlaced I-frames, P-frames and B-frames, data for each frame consists of a frame header followed by data for the macroblock layer (whether for intra or various inter type macroblocks). The bitstream elements that make up the macroblock layer for interlaced I-frames, P-frames, and B-frames are shown in FIGS. 21, 22, and 23, respectively. (Bitstream elements for macroblocks in interlaced BI-frames are identical to those for macroblocks in interlaced I-frames.)

The following sections describe selected bitstream elements in frame, field, and macroblock layers. Although the selected bitstream elements are described in the context of a particular layer, some bitstream elements can be used in more than one layer.

1. Selected Frame and Field Layer Elements

FIGS. 14, 16, 18, 19, and 20 are diagrams showing frame-level bitstream syntaxes for progressive I-frames/progressive BI-frames, frames having interlaced I-fields or BI-fields, interlaced I-frames/interlaced BI-frames, interlaced P-frames, and interlaced B-frames, respectively. FIG. 17 is a diagram showing a field-level bitstream syntax for interlaced I-fields. Some elements (e.g., the ACPRED bitplane) also are present in a field-level bitstream syntax for interlaced BI-fields, and potentially in syntaxes for other picture types. Specific bitstream elements are described below.

Frame Coding Mode (FCM) (Variable Size)

FCM is a variable length codeword ["VLC"] used to indicate the picture coding type. FCM takes on values for frame coding modes as shown in Table 1 below:

TABLE 1

| Frame Coding Mode VLC | |
| --- | --- |
| FCM value | Frame Coding Mode |
| 0 | Progressive |
| 10 | Frame-Interlace |
| 11 | Field-Interlace |

Field Picture Type (FPTYPE) (3 bits)

FPTYPE is a three-bit syntax element present in the frame header for a frame including interlaced I-fields and/or interlaced BI-fields, and potentially other kinds of fields. FPTYPE takes on values for different combinations of field types in the interlaced video frame, according to Table 2 below.

TABLE 2

| Field Picture Type FLC | | |
| --- | --- | --- |
| FPTYPE FLC | First Field Type | Second Field Type |
| 000 | I | I |
| 001 | I | P |
| 010 | P | I |
| 011 | P | P |
| 100 | B | B |
| 101 | B | BI |
| 110 | BI | B |
| 111 | BI | BI |

Picture Type (PTYPE) (Variable Size)

PTYPE is a variable size syntax element present in the frame header for interlaced P-frames and interlaced B-frames (or other kinds of interlaced frames such as interlaced I-frames). PTYPE takes on values for different frame types according to Table 3 below.

TABLE 3

| Picture Type VLC | |
| --- | --- |
| PTYPE VLC | Picture Type |
| 110 | I |
| 0 | P |
| 10 | B |
| 1110 | BI |
| 1111 | Skipped |

If PTYPE indicates that the frame is skipped then the frame is treated as a P-frame which is identical to its reference frame. The reconstruction of the skipped frame is equivalent conceptually to copying the reference frame. A skipped frame means that no further data is transmitted for this frame.

Field Transform Bitplane (FIELDTX) (Variable Size)

At frame level or field level, FIELDTX is a bitplane indicating whether macroblocks in an interlaced I-frame are frame-coded or field-coded. FIELDTX is explained in further detail below and in Section IV, above.

AC Prediction Bitplane (ACPRED) (Variable Size)

For progressive I-frames and BI-frames and for interlaced I-frames and BI-frames, 1-bit ACPRED syntax elements that would be present in all macroblocks are jointly coded using a bitplane coded syntax element that indicates the AC prediction status for each macroblock in the frame. The decoded bitplane represents the AC prediction status for each macroblock as 1-bit values. The ACPRED bitplane is described in further detail below and in Section V, above.

3. Selected Macroblock Layer Elements

FIGS. 15, 21, 22, and 23 are diagrams showing macroblock-level bitstream syntaxes for macroblocks in progressive I-frames/interlaced I-fields/interlaced BI-fields, interlaced I-frames/interlaced BI-frames, interlaced P-frames, and interlaced B-frames, respectively, in the combined implementation. Specific bitstream elements are described below. Data for a macroblock consists of a macroblock header followed by block layer data. Bitstream elements in the macroblock layer (e.g., ACPRED, FIELDTX, etc.) also may be present for macroblocks for other picture types.

AC Prediction Flag (ACPRED) (1 Bit)

In the combined implementation, the ACPRED syntax element is present in all progressive I-frame, interlaced I-frame, interlaced BI-frame, interlaced I-field, and interlaced BI-field macroblocks, and intra macroblocks in interlaced P-fields, interlaced B-fields, interlaced P-frames, and interlaced B-frames. ACPRED is also present in macroblocks in progressive P-frames and B-frames. At macroblock level, ACPRED is a 1-bit syntax element that specifies whether the blocks in the macroblock were coded using AC prediction. ACPRED=0 indicates that AC prediction is not used. ACPRED=1 indicates that AC prediction is used. ACPRED also can be encoded as a frame-level bitplane, as explained in further detail in Section V, above.

Field Transform Flag (FIELDTX) (1 Bit)

FIELDTX is a 1-bit syntax present in intra-coded macroblocks in interlaced I-frames, interlaced BI-frames, interlaced P-frames, and interlaced B-frames. This syntax element indicates whether a macroblock is frame or field coded (basically, the internal organization of the macroblock). FIELDTX=1 indicates that the macroblock is field-coded. Otherwise, the macroblock is frame-coded. In inter-coded macroblocks, this syntax element can be inferred from the macroblock-level bitstream element MBMODE. FIELDTX also can be encoded as a frame-level bitplane, as explained in further detail in Section IV, above.

B. Bitplane Coding

Macroblock-specific binary information such as skip bits may be encoded in one binary symbol per macroblock. For example, whether or not a macroblock is skipped may be signaled with one bit. In these cases, the status for all macroblocks in a field or frame may be coded as a bitplane and transmitted in the field or frame header. One exception for this rule is if the bitplane coding mode is set to Raw Mode, in which case the status for each macroblock is coded as one bit per symbol and transmitted along with other macroblock level syntax elements at the macroblock level.

Field/frame-level bitplane coding is used to encode two-dimensional binary arrays. The size of each array is rowMB×colMB, where rowMB and colMB are the number of macroblock rows and columns, respectively, in the field or frame in question. Within the bitstream, each array is coded as a set of consecutive bits. One of seven modes is used to encode each array. The seven modes are:

1. raw mode—information coded as one bit per symbol and transmitted as part of MB level syntax;
2. normal-2 mode—two symbols coded jointly;
3. differential-2 mode—differential coding of the bitplane, followed by coding two residual symbols jointly;
4. normal-6 mode—six symbols coded jointly;
5. differential-6 mode—differential coding of the bitplane, followed by coding six residual symbols jointly;
6. row-skip mode—one bit skip to signal rows with no set bits; and
7. column-skip mode—one bit skip to signal columns with no set bits.

The syntax elements for a bitplane at the field or frame level are in the following sequence: INVERT, IMODE, and DATABITS.

Invert Flag (INVERT)

The INVERT syntax element is a 1-bit value, which if set indicates that the bitplane has more set bits than zero bits. Depending on INVERT and the mode, the decoder shall invert the interpreted bitplane to recreate the original. Note that the value of this bit shall be ignored when the raw mode is used. Description of how the INVERT value is used in decoding the bitplane is provided below.

Coding Mode (IMODE)

The IMODE syntax element is a variable length value that indicates the coding mode used to encode the bitplane. Table 4 shows the code table used to encode the IMODE syntax element. Description of how the IMODE value is used in decoding the bitplane is provided below.

TABLE 4

IMODE VLC Codetable

| IMODE VLC | Coding mode |
| --- | --- |
| 10 | Norm-2 |
| 11 | Norm-6 |
| 010 | Row-skip |
| 011 | Colskip |
| 001 | Diff-2 |
| 0001 | Diff-6 |
| 0000 | Raw |

Bitplane Coding Bits (DATABITS)

The DATABITS syntax element is variable sized syntax element that encodes the stream of symbols for the bitplane. The method used to encode the bitplane is determined by the value of IMODE. The seven coding modes are described in the following sections.

Raw Mode

In this mode, the bitplane is encoded as one bit per symbol (e.g., in raster-scan order), and sent as part of the macroblock layer. Alternatively, the information is coded in raw mode at the field or level and DATABITS is rowMB×colMB bits in length.

Normal-2 Mode

If rowMB×colMB is odd, the first symbol is encoded raw. Subsequent symbols are encoded pairwise, in natural scan order. The binary VLC table in Table 5 is used to encode symbol pairs.

TABLE 5

Norm-2/Diff-2 Code Table

| Symbol 2n | Symbol 2n + 1 | Codeword |
| --- | --- | --- |
| 0 | 0 | 0 |
| 1 | 0 | 100 |
| 0 | 1 | 101 |
| 1 | 1 | 11 |

Diff-2 Mode

The Normal-2 method is used to produce the bitplane as described above, and then the $Diff^{-1}$ operation is applied to the bitplane as described below.

Normal-6 Mode

Figure 24A:
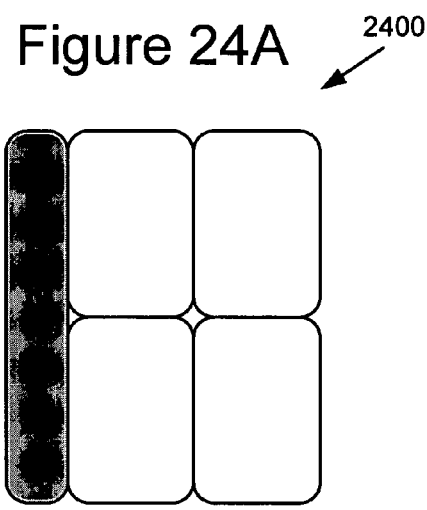
FIGS. 24A–24C are diagrams showing tiles for normal-6 and diff-6 bitplane coding modes according to the prior art.
Figure 24B:
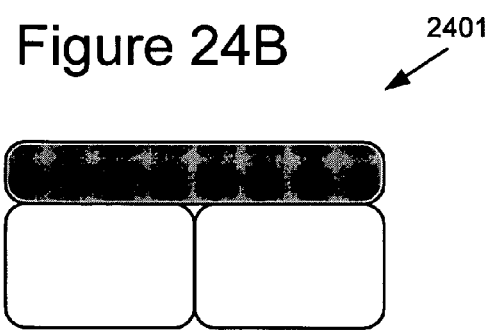
Figure 24C:
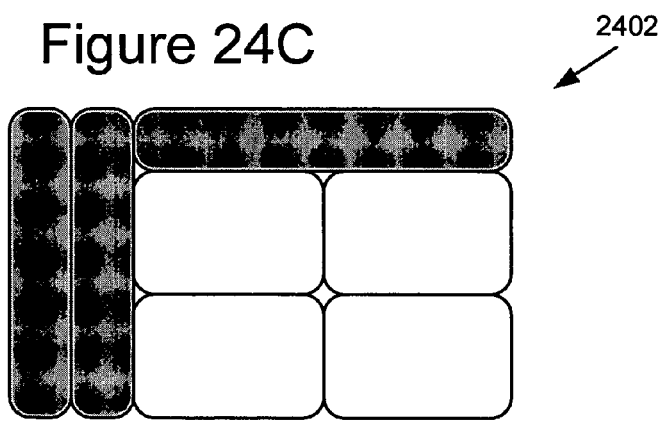

In the Norm-6 and Diff-6 modes, the bitplane is encoded in groups of six pixels. These pixels are grouped into either 2×3 or 3×2 tiles. The bitplane is tiled maximally using a set of rules, and the remaining pixels are encoded using a variant of row-skip and column-skip modes. 2×3 "vertical" tiles are used if and only if rowMB is a multiple of 3 and colMB is not. Otherwise, 3×2 "horizontal" tiles are used. FIG. 24A shows a simplified example of 2×3 "vertical" tiles. FIGS. 24B and 24C show simplified examples of 3×2 "horizontal" tiles for which the elongated dark rectangles are 1 pixel wide and encoded using row-skip and column-skip coding. For a plane tiled as shown in FIG. 24C, with linear tiles along the top and left edges of the picture, the coding order of the tiles follows the following pattern. The 6-element tiles are encoded first, followed by the column-skip and row-skip encoded linear tiles. If the array size is a multiple of 2×3 or of 3×2, the latter linear tiles do not exist and the bitplane is perfectly tiled.

The 6-element rectangular tiles are coded using a combination of variable-length and fixed-length codes. Let N be the number of set bits in the tile, i.e. $0 \leq N \leq 6$. For N<3, a VLC is used to encode the tile. For N=3, a fixed length escape code is followed by a 5-bit fixed length code. For N>3, another fixed length escape code is followed by a VLC. For N>3, the VLC which follows the escape code is identical to the VLC used to the code of the complement of this tile for the N<3 case. The fixed length escape used for the case of N>3 is different from the fixed length escape code for the N=3 case. The rectangular tile contains six bits of information. Let k be the code associated with the tile, where $$k = \sum_i b_i 2^i,$$

$b_i$ is the binary value of the $i^{th}$ bit in natural scan order within the tile. Hence, $0 \leq k < 64$. A combination of VLCs and escape codes plus fixed length codes is used to signal k.

Diff-6 Mode

The Normal-6 method is used to produce the bitplane as described above, and then the $Diff^{-1}$ operation is applied to the bitplane as described below.

Row-Skip Mode

In the row-skip coding mode, all-zero rows are skipped with one bit overhead. The syntax is as follows: for each row, a single ROWSKIP bit indicates if the row is skipped; if the row is skipped, the ROWSKIP bit for the next row is next; otherwise (the row is not skipped), ROWBITS bits (a bit for each macroblock in the row) are next. Thus, if the entire row is zero, a zero bit is sent as the ROWSKIP symbol, and ROWBITS is skipped. If there is a set bit in the row, ROWSKIP is set to 1, and the entire row is sent raw (ROWBITS). Rows are scanned from the top to the bottom of the field or frame.

Column-Skip Mode

Column-skip is the transpose of row-skip. Columns are scanned from the left to the right of the field or frame.

Diff$^{-1}$:: Inverse Differential Decoding

If either differential mode (Diff-2 or Diff-6) is used, a bitplane of "differential bits" is first decoded using the corresponding normal modes (Norm-2 or Norm-6 respectively). The differential bits are used to regenerate the original bitplane. The regeneration process is a 2-D DPCM on a binary alphabet. In order to regenerate the bit at location (i,j), the predictor $b_p(i,j)$ is generated as follows (from bits b(i, j) at positions (i,j)):

$$b_p(i, j) = \begin{cases} A & i = j = 0, \text{ or } b(i, j-1) \neq b(i-1, j) \\ b(0, j-1) & i = 0 \\ b(i-1, j) & \text{otherwise} \end{cases}$$

For the differential coding mode, the bitwise inversion process based on INVERT is not performed. However, the INVERT flag is used in a different capacity to indicate the value of the symbol A for the derivation of the predictor shown above. More specifically, A=0 if INVERT=0 and A=1 if INVERT=1. The actual value of the bitplane is obtained by xor'ing the predictor with the decoded differential bit value. In the above equation, b(i,j) is the bit at the i,jth position after final decoding (i.e. after doing Norm-2/Norm-6, followed by differential xor with its predictor).

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:
 selecting a bitplane mode from a group of plural available bitplane modes; and
 processing a bitplane according to the selected bitplane mode, wherein the bitplane indicates AC prediction status information for plural macroblocks of a first video picture;
 wherein a second video picture includes one or more intra macroblocks and one or more inter macroblocks, and wherein a per macroblock AC prediction status bit is signaled for each of the one or more intra macroblocks but not for any of the one or more inter macroblocks.

2. The method of claim 1 wherein the AC prediction status information indicates for each of the plural macroblocks of the first video picture whether or not the macroblock is coded using AC prediction.

3. The method of claim 1 wherein the first video picture is a progressive intra frame, an interlaced intra frame, or an interlaced intra field.

4. The method of claim 1 wherein the processing comprises encoding.

5. The method of claim 1 wherein the processing comprises decoding.

6. A computer-readable medium having stored thereon computer-executable instructions for causing a computer system programmed thereby to perform the method of claim 1.

7. A method comprising:
 encoding a bitplane that indicates AC prediction status information for plural macroblocks of a first video picture; and
 signaling the encoded bitplane;
 wherein a second video picture includes one or more intra macroblocks and one or more inter macroblocks, and wherein a per macroblock AC prediction status bit is signaled for each of the one or more intra macroblocks but not for any of the one or more inter macroblocks.

8. The method of claim 7 wherein the bitplane includes one AC prediction status bit for each of the plural macroblocks of the first video picture to indicate whether or not the macroblock is coded using AC prediction.

9. The method of claim 7 wherein the encoded bitplane is signaled at field or frame layer in a bitstream.

10. A computer-readable medium having stored thereon computer-executable instructions for causing a computer system programmed thereby to perform the method of claim 7.

11. A method comprising:
 receiving an encoded bitplane; and
 decoding the bitplane, wherein the bitplane indicates AC prediction status information for plural macroblocks of a first video picture;
 wherein a second video picture includes one or more intra macroblocks and one or more inter macroblocks, and wherein a per macroblock AC prediction status bit is signaled for each of the one or more intra macroblocks but not for any of the one or more inter macroblocks.

12. The method of claim 11 wherein the bitplane includes one AC prediction status bit for each of the plural macroblocks of the first video picture to indicate whether or not the macroblock is coded using AC prediction.

13. The method of claim 11 wherein the encoded bitplane is signaled at field or frame layer in a bitstream.

14. A computer-readable medium having stored thereon computer-executable instructions for causing a computer system programmed thereby to perform the method of claim 11.

15. A method comprising:
 selecting a bitplane mode from a group of plural available bitplane modes;
 processing a bitplane according to the selected bitplane mode, wherein the bitplane indicates AC prediction status information for plural macroblocks of a video picture; and for a second video picture, for each of at least one but not all of plural macroblocks of the second video picture, processing an AC prediction status bit signaled at macroblock layer;

wherein the second video picture includes one or more intra macroblocks and one or more inter macroblocks, wherein the AC prediction status bit is a per macroblock AC prediction status bit, and wherein the per macroblock AC prediction status bit is signaled for each of the one or more intra macroblocks but not for any of the one or more inter macroblocks.

16. A method comprising:

selecting a bitplane mode from a group of plural available bitplane coding/decoding modes, wherein the plural available bitplane coding/decoding modes include row-skip, column-skip, pair-wise VLC, group-of-six VLC, and one or more differential modes; and processing a bitplane according to the selected bitplane coding/decoding mode, wherein the bitplane indicates AC prediction status information for plural macroblocks of a video picture.

17. A method comprising:

encoding a bitplane that indicates AC prediction status information for plural macroblocks of a video picture;

signaling the encoded bitplane; and for each of one or more intra macroblocks of a second video picture, signaling a per macroblock AC prediction status bit at macroblock layer;

wherein the second video picture includes one or more intra macroblocks and one or more inter macroblocks, and wherein the per macroblock AC prediction status bit is signaled for each of the one or more intra macroblocks but not for any of the one or more inter macroblocks.

18. The method of claim 17 wherein the second video picture is a motion-compensated picture.

19. A method comprising:

receiving an encoded bitplane;

decoding the bitplane, wherein the bitplane indicates AC prediction status information for plural macroblocks of a video picture; and for each of one or more intra macroblocks of a second video picture, receiving a per macroblock AC prediction status bit at macroblock layer;

wherein the second video picture includes one or more intra macroblocks and one or more inter macroblocks, and wherein the per macroblock AC prediction status bit is signaled for each of the one or more intra macroblocks but not for any of the one or more inter macroblocks.

20. The method of claim 19 wherein the second video picture is a motion-compensated picture.

* * * * *